United States Patent
Yamamoto et al.

(10) Patent No.: US 9,143,763 B2
(45) Date of Patent: Sep. 22, 2015

(54) IMAGING APPARATUS, IMAGING METHOD, AND COMPUTER-READABLE RECORDING MEDIUM

(71) Applicants: OLYMPUS CORPORATION, Shibuya-ku, Tokyo (JP); OLYMPUS IMAGING CORP., Shibuya-ku, Tokyo (JP)

(72) Inventors: Sachie Yamamoto, Hino (JP); Mai Yamaguchi, Hachioji (JP); Yuiko Uemura, Hachioji (JP); Tomomi Uemura, Jakarta (ID); Osamu Nonaka, Sagamihara (JP)

(73) Assignee: OLYMPUS CORPORATION (JP)

( * ) Notice: Subject to any disclaimer, the term of this patent is extended or adjusted under 35 U.S.C. 154(b) by 0 days.

(21) Appl. No.: 14/530,067

(22) Filed: Oct. 31, 2014

(65) Prior Publication Data

US 2015/0138321 A1   May 21, 2015

Related U.S. Application Data

(63) Continuation of application No. PCT/JP2014/063354, filed on May 20, 2014.

(30) Foreign Application Priority Data

Nov. 20, 2013   (JP) .................................. 2013-240393

(51) Int. Cl.
*H04N 13/02* (2006.01)
*H04N 13/00* (2006.01)

(52) U.S. Cl.
CPC ....... *H04N 13/0271* (2013.01); *H04N 13/0221* (2013.01); *H04N 2013/0081* (2013.01)

(58) Field of Classification Search
None
See application file for complete search history.

(56) References Cited

U.S. PATENT DOCUMENTS

| | | | |
|---|---|---|---|
| 2011/0141114 A1* | 6/2011 | Chen et al. | 345/428 |
| 2013/0010095 A1* | 1/2013 | Aoki et al. | 348/77 |
| 2014/0104483 A1 | 4/2014 | Kunishige | |

FOREIGN PATENT DOCUMENTS

| | | |
|---|---|---|
| JP | 2005-086283 A | 3/2005 |
| JP | 2011-041133 A | 2/2011 |

(Continued)

OTHER PUBLICATIONS

International Search Report and Written Opinion mailed in corresponding International Patent Application No. PCT/JP2014/063354 on Jul. 29, 2014, consisting of 4 pp. (English Translation Provided).

*Primary Examiner* — Kate Luo
(74) *Attorney, Agent, or Firm* — Volpe and Koenig, P.C.

(57) ABSTRACT

An imaging apparatus includes: a face detector that detects a face of a subject from images captured by an imaging unit; a display controller that causes a display unit to display a guide image for prompting the subject to change a direction of the face; an angle calculation unit that calculates an angle of turn of the face of the subject from a reference position of the direction of the face when the guide image is displayed, based on pieces of image data before and after a change in the direction of the face; a distance calculation unit that calculates a distance between the imaging apparatus and the face based on the calculated angle; and an image processing unit that performs image processing on at least one of the pieces of image data, according to the change in the direction of the face, based on the angle and the distance.

9 Claims, 23 Drawing Sheets

(56) References Cited

FOREIGN PATENT DOCUMENTS

| JP | 2012-105016 A | 5/2012 |
| JP | 2012-231200 A | 11/2012 |
| JP | 2013-175802 A | 9/2013 |
| WO | 2012147560 A1 | 1/2012 |

* cited by examiner (FIRST TIME)　　(SECOND TIME)

(FIRST TIME) (SECOND TIME)

IMAGING APPARATUS, IMAGING METHOD, AND COMPUTER-READABLE RECORDING MEDIUM

CROSS REFERENCES TO RELATED APPLICATIONS

This application is a continuation of PCT international application Ser. No. PCT/JP2014/063354 filed on May 20, 2014 which designates the United States, incorporated herein by reference, and which claims the benefit of priority from Japanese Patent Application No. 2013-240393, filed on Nov. 20, 2013, incorporated herein by reference.

BACKGROUND

1. Technical Field

The disclosure relates to an imaging apparatus, an imaging method, and a computer-readable recording medium for capturing images of a subject to generate image data of the subject.

2. Related Art

In recent years, a technology in an imaging apparatus such as a digital camera has been known which can rotate a display screen of a display monitor on which an image is displayed, from a photographer side to a subject side with respect to a main body generating image data (see Japanese Laid-open Patent Publication No. 2013-175802). This technology can shoot a self-portrait photograph, which is the shooting of a photographer himself/herself as a subject, by rotating the display monitor from the photographer side to the subject side.

SUMMARY

In accordance with some embodiments, an imaging apparatus, an imaging method, and a computer-readable recording medium are presented.

In some embodiments, an imaging apparatus includes: an imaging unit configured to capture images of a subject to generate image data of the subject; a display unit configured to display the images corresponding to the image data generated by the imaging unit; a face detector configured to detect a face of the subject from the images corresponding to the image data generated by the imaging unit; a display controller configured to cause the display unit to display a guide image for prompting the subject to change a direction of the face detected by the face detector; an angle calculation unit configured to calculate an angle of turn of the face of the subject from a reference position of the direction of the face of the subject when the display unit displays the guide image, based on the images corresponding to pieces of image data before and after a change in the direction of the face of the subject, the pieces of image data having been generated by the imaging unit; a distance calculation unit configured to calculate a distance between the imaging apparatus and the face of the subject based on the angle calculated by the angle calculation unit; and an image processing unit configured to perform image processing on at least one of the pieces of image data before and after the change in the direction of the face of the subject, the pieces of image data having been generated by the imaging unit, according to the change in the direction of the face of the subject detected by the face detector, based on the angle calculated by the angle calculation unit and the distance calculated by the distance calculation unit.

In some embodiments, an imaging method to be executed by an imaging apparatus that is configured to capture images of a subject to generate image data of the subject and to display the images corresponding to the image data is presented. The imaging method includes: an imaging step of capturing the images of the subject to generate the image data of the subject; a face detecting step of detecting a face of the subject from the images corresponding to the image data generated in the imaging step; a display step of displaying a guide image to prompt the subject to change a direction of the face detected in the face detecting step; an angle calculation step of calculating an angle of turn of the face of the subject from a reference position of the direction of the face of the subject when displaying the guide image in the display step, based on the images corresponding to pieces of image data before and after a change in the direction of the face of the subject, the pieces of image data having been generated in the imaging step; a distance calculation step of calculating a distance between the imaging apparatus and the face of the subject based on the angle calculated in the angle calculation step; and an image processing step of performing image processing on at least one of the pieces of image data before and after the change in the direction of the face of the subject, the pieces of image data having been generated in the imaging step, according to the change in the direction of the face of the subject detected in the face detecting step, based on the angle calculated in the angle calculation step and the distance calculated in the distance calculation step.

In some embodiments, a non-transitory computer-readable recording medium with an executable program stored thereon is presented. The program instructs an imaging apparatus, which is configured to capture images of a subject to generate image data of the subject and to display the images corresponding to the image data, to perform: an imaging step of capturing the images of the subject to generate the image data of the subject; a face detecting step of detecting a face of the subject from the images corresponding to the image data generated in the imaging step; a display step of displaying a guide image to prompt the subject to change a direction of the face detected in the face detecting step; an angle calculation step of calculating an angle of turn of the face of the subject from a reference position of the direction of the face of the subject when displaying the guide image in the display step, based on the images corresponding to pieces of image data before and after a change in the direction of the face of the subject, the pieces of image data having been generated in the imaging step; a distance calculation step of calculating a distance between the imaging apparatus and the face of the subject based on the angle calculated in the angle calculation step; and an image processing step of performing image processing on at least one of the pieces of image data before and after the change in the direction of the face of the subject, the pieces of image data having been generated in the imaging step, according to the change in the direction of the face of the subject detected in the face detecting step, based on the angle calculated in the angle calculation step and the distance calculated in the distance calculation step.

The above and other features, advantages and technical and industrial significance of this invention will be better understood by reading the following detailed description of presently preferred embodiments of the invention, when considered in connection with the accompanying drawings.

DETAILED DESCRIPTION

Hereinafter, modes for carrying out the present invention (hereinafter referred to as the "embodiments") will be described with reference to the drawings. The present invention is not limited by the following embodiments. The same reference signs are used to refer to the same elements throughout the drawings.

First Embodiment

Figure 1:
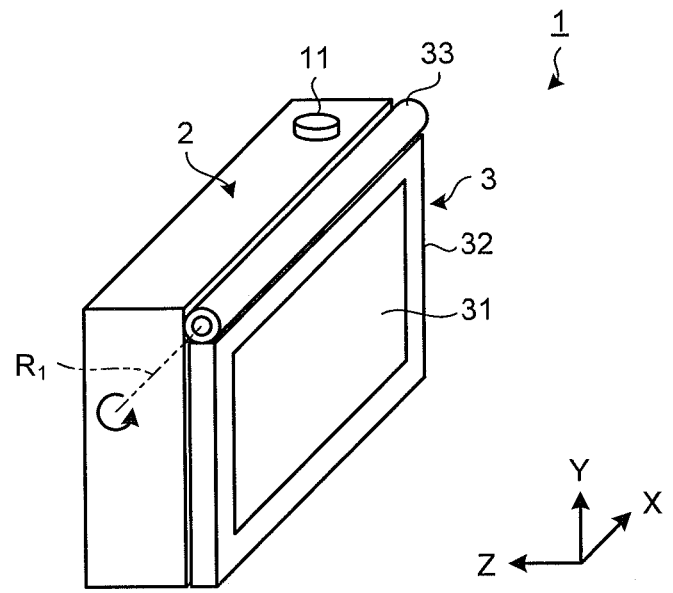
FIG. 1 is a perspective view illustrating a configuration of an imaging apparatus according to a first embodiment of the present invention on a side facing a photographer.
Figure 2:
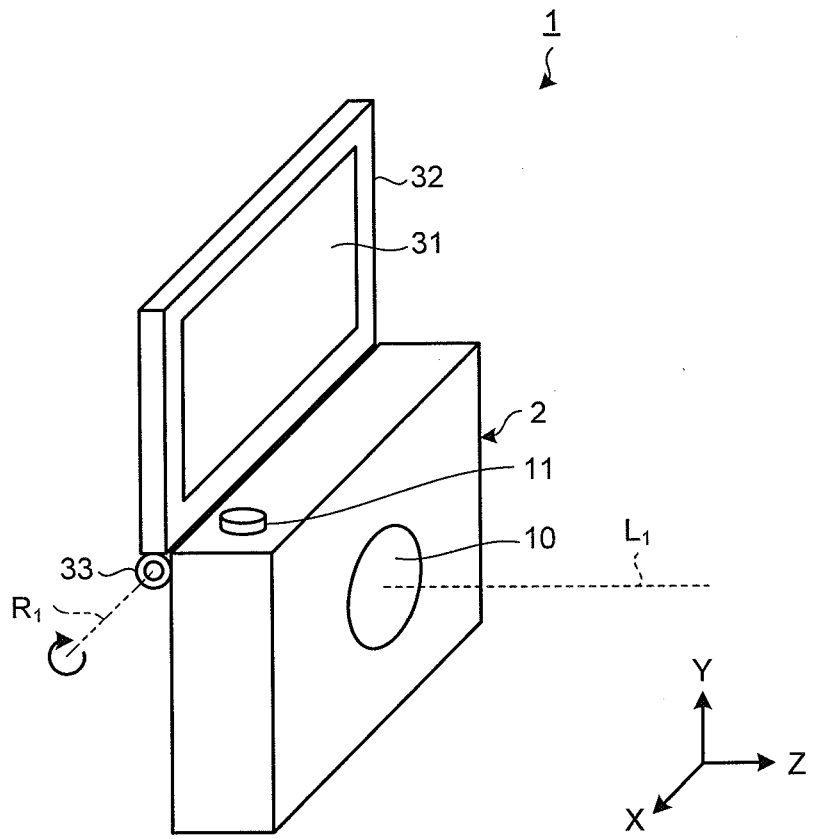
FIG. 2 is a perspective view illustrating a configuration of the imaging apparatus according to the first embodiment of the present invention on a side facing a subject.
Figure 3:
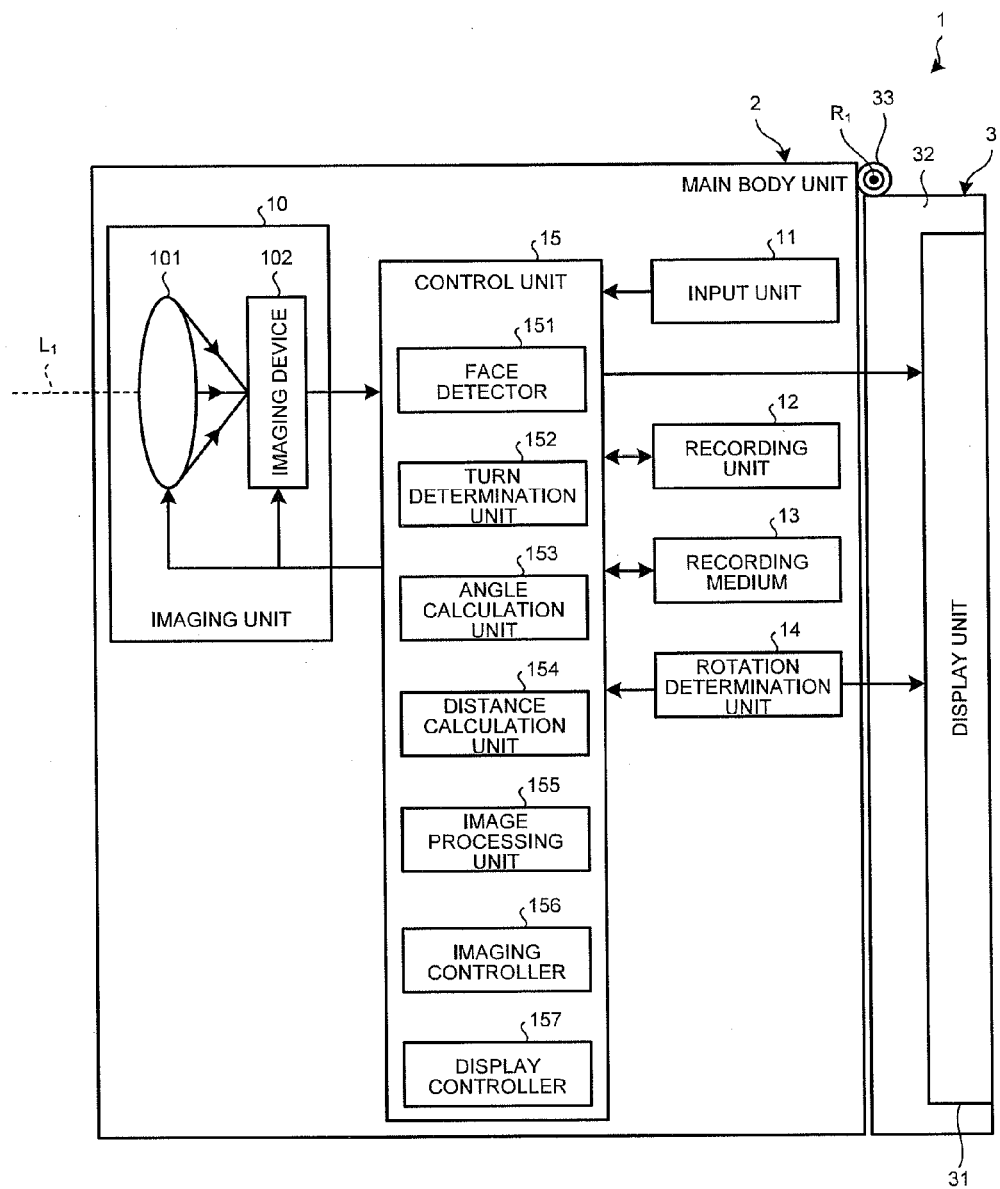
FIG. 3 is a block diagram illustrating the functional configuration of the imaging apparatus according to the first embodiment of the present invention.

FIG. 1 is a perspective view illustrating a configuration of an imaging apparatus according to the present invention on a side (rear side) facing a photographer. FIG. 2 is a perspective view illustrating a configuration of the imaging apparatus according to the present invention on a side (front side) facing a subject. FIG. 3 is a block diagram illustrating the functional configuration of the imaging apparatus according to the present invention. In FIGS. 1 and 2, a width direction of an imaging apparatus 1 is defined as an X axis, a height direction of the imaging apparatus 1 is defined as a Y axis, and an optical axis $L_1$ direction of the imaging apparatus 1 is defined as a Z axis.

The imaging apparatus 1 illustrated in FIGS. 1 to 3 includes a main body unit 2 that images a subject and generates image data of the subject, and a display mechanism 3 that is provided in such a manner as to be able to pivot from the photographer side (rear side) to the subject side (front side) with respect to the main body unit 2, and that can display an image corresponding to the image data generated by the main body unit 2.

Firstly, the configuration of the main body unit 2 is described. The main body unit 2 includes an imaging unit 10, an input unit 11, a recording unit 12, a recording medium 13, a rotation determination unit 14, and a control unit 15.

The imaging unit 10 includes a lens unit 101 that forms an image of the subject, and an imaging device 102 that receives light of the subject image formed by the lens unit 101, performs photoelectric conversion thereon, and generates image data of the subject.

The lens unit 101 collects light from a specified area of the field of view, and forms the subject image on an imaging surface of the imaging device 102 under the control of the control unit 15. The lens unit 101 is configured using a zoom lens and a focus lens, which can move along the optical axis $L_1$, a diaphragm, a shutter, and the like.

The imaging device 102 receives light of the subject image formed by the lens unit 101, performs photoelectric conversion thereon, and generates image data under the control of the control unit 15. The imaging device 102 is configured using a charge coupled device (CCD) or complementary metal oxide semiconductor (CMOS), a signal processing unit that performs a specified analog process on the image data, an A/D conversion unit that performs A/D conversion on the analog image data input from the signal processing unit, and accordingly generates digital image data to output the image data to control unit 15, a timing generator that generates imaging timing of the imaging device 102, and the like. The imaging device 102 continuously images the subject at a specified frame rate (for example, 30 fps), and generates a plurality of temporally continuous pieces of image data under the control of the control unit 15.

The input unit 11 receives the input of instruction signals to instruct various operations related to the imaging apparatus 1. The input unit 11 is configured using a power switch that switches the power state of the imaging apparatus 1 between an ON state and an OFF state, a release switch that accepts the input of a release signal to instruct the imaging apparatus 1 to shoot an image, and the like.

Image data input via the control unit 15, information being processed by the imaging apparatus 1, various programs for operating the imaging apparatus 1, a program according to the first embodiment, various pieces of data used during execution of the program, and the like are recorded in the recording unit 12. The recording unit 12 is configured using synchronous dynamic random access memory (SDRAM), flash memory, and the like.

Image data input via the control unit 15 is recorded in the recording medium 13. The recording medium 13 is configured using a memory card to be mounted from the outside of the main body unit 2, and the like, and is detachably mounted in the main body unit 2 via an unillustrated memory I/F. Image data and moving image data on which a process is performed by the control unit 15 are written to the recording medium 13. Moreover, image data or moving image data recorded by the control unit 15 is read from the recording medium 13.

The rotation determination unit 14 determines the rotation state of the display mechanism 3, and outputs the determination result to the control unit 15. Specifically, a display area of a display unit 31 of the display mechanism 3 pivots to the front side of the imaging apparatus 1 with respect to the main body unit 2. The rotation determination unit 14 determines whether or not the display area of the display unit 31 faces the front side (subject side), and outputs the determination result to the control unit 15.

The control unit 15 controls the overall operation of the imaging apparatus 1 by, for example, providing instructions to and transferring data to the units constituting the imaging apparatus 1. The control unit 15 is configured using a central processing unit (CPU) and the like.

The configuration of the control unit 15 is described in detail. The control unit 15 includes a face detector 151, a turn determination unit 152, an angle calculation unit 153, a distance calculation unit 154, an image processing unit 155, an imaging controller 156, and a display controller 157.

The face detector 151 detects the face of the subject in an image corresponding to the image data generated by the imaging unit 10. Specifically, the face detector 151 detects the face of a person included in the image corresponding to the image data generated by the imaging unit 10, by pattern matching. For example, the face detector 151 detects the position of the face in the image using pattern matching, and then detects the positions of feature points of the face such as eyes, nose, and mouth. Accordingly, the face detector 151 detects the position of the face, the size (area) of the face, the direction of the face, the angle (turn) of the face, and an expression on the face (such as a smile). The face detector 151 may detect not only the face of a person, but also the faces of animals such as a dog and a cat. Furthermore, the face detector 151 may detect the face of a person using a known technology other than pattern matching.

The turn determination unit 152 determines whether or not the face of the subject detected by the face detector 151 has been turned from the state of facing the front, based on images corresponding two temporally adjacent pieces of image data.

The angle calculation unit 153 calculates the angle of turn of the face of the subject from a reference position of the direction of the face of the subject, based on the images corresponding to the two temporally adjacent pieces of image data, when the display unit 31 described below displays a guide image. For example, the angle calculation unit 153 calculates the angle of turn of the face of the subject with respect to the center of the eyes of the face of the subject detected by the face detector 151.

The distance calculation unit 154 calculates the distance between the imaging apparatus 1 and the subject, based on the angle calculated by the angle calculation unit 153.

The image processing unit 155 performs image processing on at least one of the pieces of image data before and after the change in the direction of the face of the subject generated by the imaging unit 10, in accordance with the change in the direction of the face of the subject detected by the face detector 151. Specifically, the image processing unit 155 performs image processing on the image data generated by the imaging unit 10, based on the angle calculated by the angle calculation unit 153 and the distance calculated by the distance calculation unit 154. The image processing includes one or more of a process of changing variables of the color space, a process of generating three-dimensional image data using two pieces of image data, a process of changing the exposure value, a process of changing the contrast, and a process of adding shade and shadow.

When a release signal has been input from the input unit 11, the imaging controller 156 performs the control to start the shooting operation of the imaging apparatus 1. The shooting operation of the imaging apparatus 1 indicates the recording of image data generated by the imaging unit 10 in the recording medium 13. Moreover, when an instruction signal to instruct the shooting of a moving image has been input from the input unit 11, the imaging controller 156 creates a moving image file in the recording medium 13, and sequentially records (stores) image data sequentially generated by the imaging unit 10 in the moving image file.

The display controller 157 causes the display unit 31 of the display mechanism 3 described below to display an image corresponding to image data. The display controller 157 causes the display unit 31 of the display mechanism 3 described below to display a guide image that prompts the subject to change the direction of the face. The guide image is an image where a part of the face of the subject has been processed, or an image of a preregistered avatar or the like.

Next, the configuration of the display mechanism 3 is described. The display mechanism 3 includes the display unit 31, a movable unit 32, and a rotation support unit 33.

The display unit 31 displays a two-dimensional image (hereinafter referred to as a "2D image") or a three-dimensional image (hereinafter referred to as a "3D image") corresponding to image data input via the control unit 15 under the control of the control unit 15. The display of an image includes rec view display for displaying image data immediately after shooting only for a specified time (for example, three seconds), playback display for playing back image data recorded in the recording medium 13, live view display for sequentially displaying live view images corresponding to image data continuously generated by the imaging unit 10 in chronological order, and the like. The display unit 31 includes liquid crystals or an organic electroluminescence material, and is configured using a display panel that can display a 2D or 3D image, a driver, and the like. A 3D image display panel is generally a frame sequential system, lenticular system, parallax barrier system, or the like. In the first embodiment, a display panel of any system can be applied. Moreover, the display unit 31 displays information on the operation of the imaging apparatus 1 and information related to shooting as appropriate. Furthermore, the display unit 31 can transit between the state where the display area displaying an image corresponding to image data faces the rear side of the imaging apparatus 1 and the state where the display area faces the front side of the imaging apparatus 1. Specifically, the display unit 31 is provided in such a manner as to be able to pivot from the rear side of the imaging apparatus 1 to the front side of the imaging apparatus 1 with respect to the main body unit 2 of the imaging apparatus 1 (see FIG. 1→FIG. 2).

The movable unit 32 is provided with the display unit 31, and is provided to the main body unit 2 in such a manner as to be able to pivot on the rotation support unit 33 such as a hinge around an end of the main body unit 2. Specifically, the movable unit 32 is provided in such a manner as to be able to pivot on an axis $R_1$ of the rotation support unit 33 from the rear side to the front side of the main body unit 2 (see FIG. 2)

Figure 4:
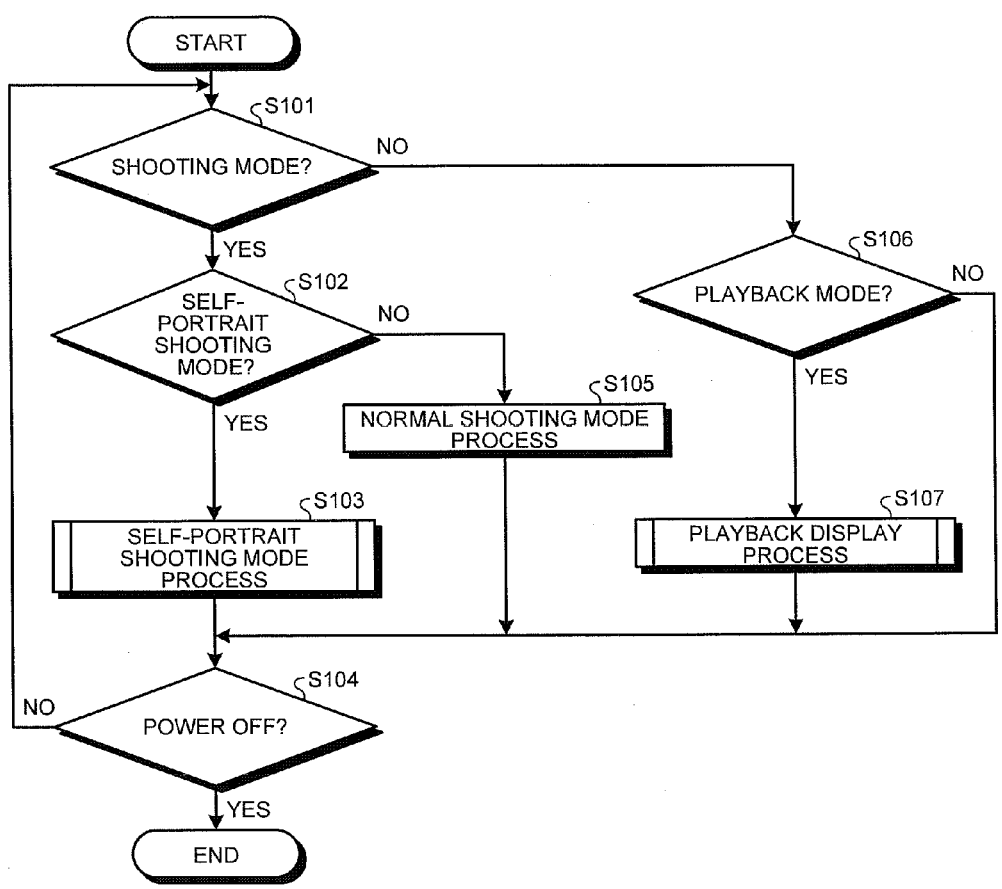
FIG. 4 is a flowchart illustrating an outline of processing to be executed by the imaging apparatus according to the first embodiment of the present invention.

Processing to be executed by the imaging apparatus 1 having the above configuration is described. FIG. 4 is a flowchart illustrating an outline of the processing to be executed by the imaging apparatus 1.

Figure 5:
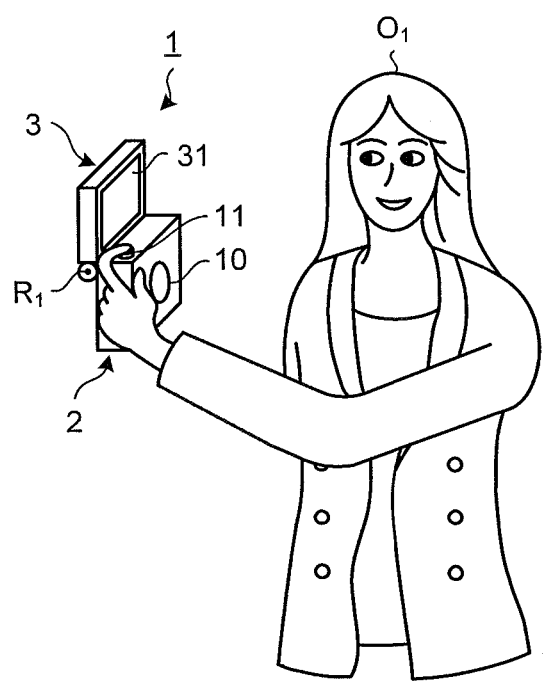
FIG. 5 is a diagram illustrating a state where the imaging apparatus according to the first embodiment of the present invention is set in self-portrait shooting mode.

Firstly, reference will be made to a case where the imaging apparatus 1 is set in shooting mode (Step S101: Yes) as illustrated in FIG. 4. In this case, the control unit 15 judges whether or not the imaging apparatus 1 is set in self-portrait shooting mode (Step S102). Specifically, the control unit 15 judges whether or not the display area of the display unit 31 faces the front side of the imaging apparatus 1 (the area of the field of view side of the imaging unit 10) with respect to the main body unit 2, based on the determination result input from the rotation determination unit 14. For example, as illustrated in FIG. 5, a subject $O_1$ (photographer) points the display area of the display unit 31 to the front side of the imaging apparatus 1, the control unit 15 judges that the imaging apparatus 1 is set in self-portrait shooing mode. If the control unit 15 judges that the imaging apparatus 1 is set in self-portrait shooting mode (Step S102: Yes), the imaging apparatus 1 proceeds to Step S103 described below. Contrarily, if the control unit 15 judges that the imaging apparatus 1 is not set in self-portrait shooting mode (Step S102: No), the imaging apparatus 1 proceeds to Step S105 described below.

In Step S103, the imaging apparatus 1 executes a self-portrait shooting mode process where the subject $O_1$ shoots in accordance with self-portrait shooting. The self-portrait shooting mode process is described in detail below.

Next, if an instruction signal to turn off the power to the imaging apparatus 1 has been input from the input unit 11 (Step S104: Yes), the imaging apparatus 1 ends the processing. Contrarily, if the instruction signal to turn off the power to the imaging apparatus 1 has not been input from the input unit 11 (Step S104: No), the imaging apparatus 1 returns to Step S101.

In Step S105, the imaging apparatus 1 executes a normal shooting mode process of shooting in response to a release signal input from the input unit 11, generating image data of the subject, and recording the image data in the recording medium 13. After Step S105, the imaging apparatus 1 proceeds to Step S104.

Reference will be made to a case where the imaging apparatus 1 is not set in shooting mode in Step S101 (Step S101: No). In this case, if the imaging apparatus 1 is set in playback mode (Step S106: Yes), the imaging apparatus 1 executes a playback display process of causing the display unit 31 to play back and display an image corresponding to image data recorded in the recording medium 13 (Step S107). The playback display process is described in detail below. After Step S107, the imaging apparatus 1 proceeds to Step S104.

If the imaging apparatus 1 is not set in playback mode in Step S106 (Step S106: No), the imaging apparatus 1 proceeds to Step S104.

Figure 6:
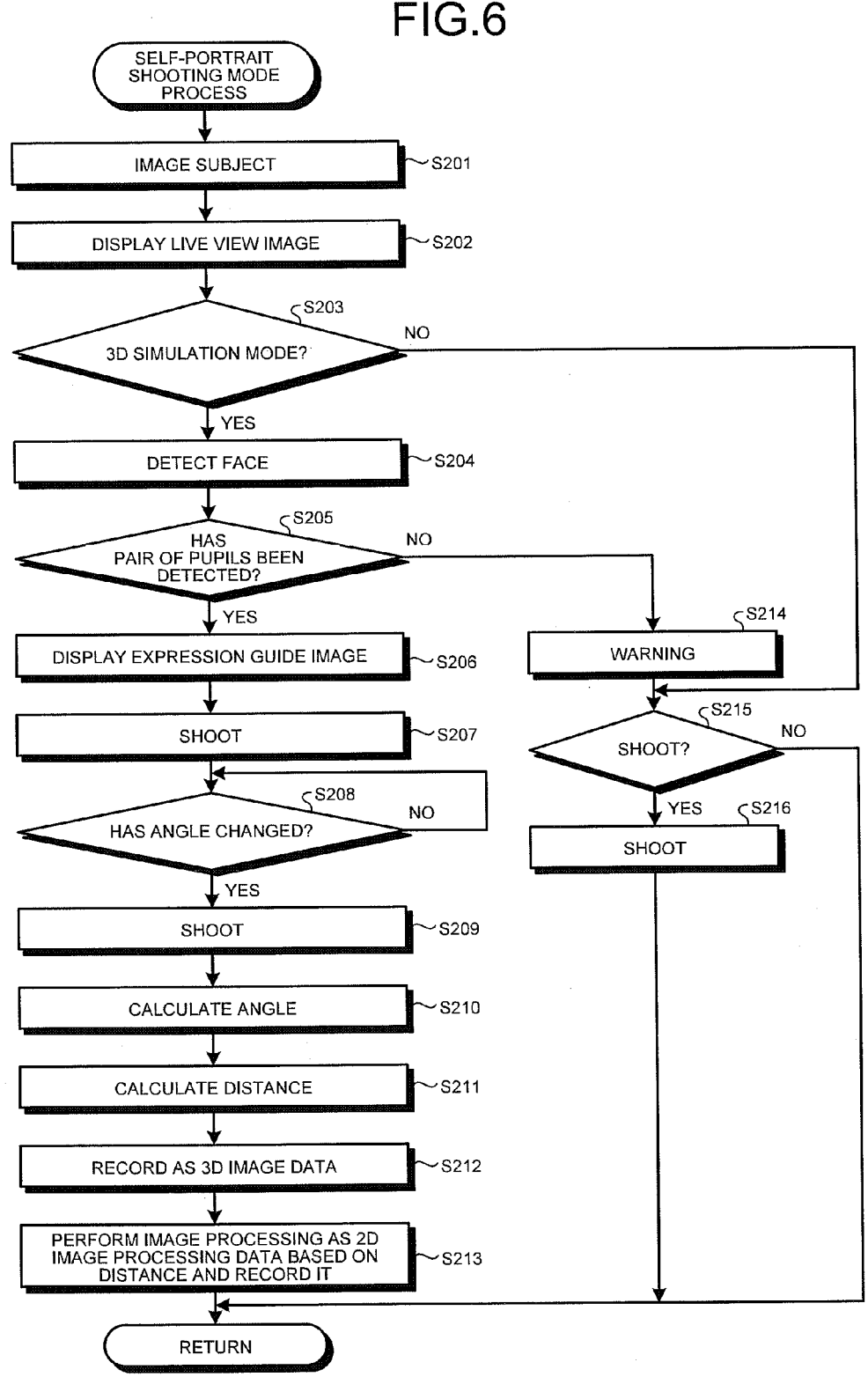
FIG. 6 is a flowchart illustrating an outline of the self-portrait shooting mode process of FIG. 4.

Next, reference will be made to the details of the self-portrait shooting mode process described in Step S103 in FIG. 4. FIG. 6 is a flowchart illustrating an outline of the self-portrait shooting mode process.

As illustrated in FIG. 6, the imaging controller 156 causes the imaging device 102 to shoot. For example, the imaging controller 156 causes the imaging device 102 to image the subject $O_1$ via the lens unit 101 (Step S201).

Next, the display controller 157 causes the display unit 31 to display a live view image corresponding to the image data generated by the imaging device 102 (Step S202). In this case, the display controller 157 reverses the live view image with respect to the main body unit 2, the live view image corresponding to the image data generated by the imaging unit 10, and causes the display unit 31 to display the live view image (reverse mirror display). The display controller 157 may reverse the live view image with respect to the main body unit 2, and then cause the display unit 31 to display the live view image reversed left-to-right. Naturally, the display controller 157 may cause the display unit 31 to display the live view image as it is without reversing the live view image.

If the imaging apparatus 1 is then set in 3D simulation mode for 3D shooting for the subject $O_1$ (Step S203: Yes), the imaging apparatus 1 proceeds to Step S204 described below. Contrarily, the imaging apparatus 1 is not set in 3D simulation mode for 3D shooting for the subject $O_1$ (Step S203: No), the imaging apparatus 1 proceeds to step S215 described below.

In Step S204, the face detector 151 detects the face of the subject in the image corresponding to the image data generated by the imaging device 102 (Step S204).

Next, if the face detector 151 detects a pair of pupils (Step S205: Yes), the display controller 157 causes the display unit 31 to display a guide image prompting the subject recorded in the recording unit 12 to change the direction of the face (Step S206).

Figure 7:
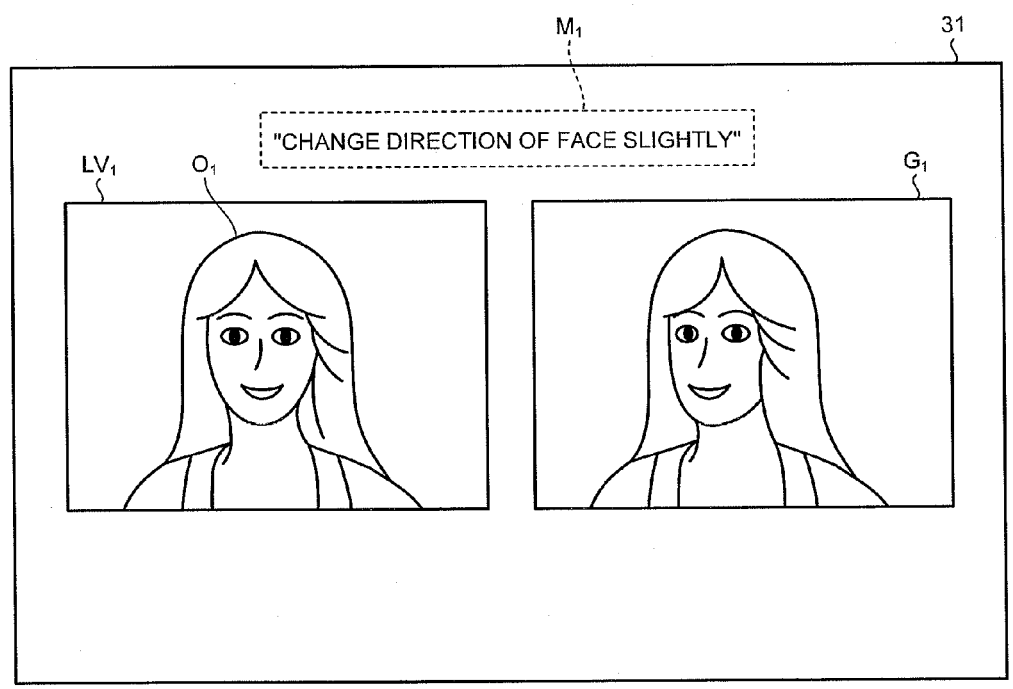
FIG. 7 is a diagram illustrating an example of a guide image displayed on a display unit of the imaging apparatus according to the first embodiment of the present invention.

FIG. 7 is a diagram illustrating an example of the guide image displayed on the display unit 31. As illustrated in FIG. 7, the display controller 157 causes the display unit 31 to display a live view image $LV_1$ corresponding to the image data generated by the imaging device 102, and a guide image $G_1$ prompting the subject $O_1$ to change the direction of the face. In this case, the display controller 157 reduces the sizes of the live view image $LV_1$ and the guide image $G_1$ and causes the display unit 31 to display them. Furthermore, the display controller 157 causes the display unit 31 to display information for supporting the guide image $G_1$, for example, a message $M_1$ "Change the direction of the face slightly." Consequently, the subject $O_1$ checks the guide image $G_1$ displayed on the display unit 31 during the self-portrait shooting and accordingly changes the direction of the face with respect to the display unit 31 or the imaging unit 10.

After Step S206, the imaging controller 156 causes the imaging device 102 to shoot (Step S207). For example, the imaging controller 156 causes the imaging device 102 to image the subject $O_1$ facing the front (a first time).

Next, the turn determination unit 152 determines whether or not the angle of the face of the subject detected by the face detector 151 has changed (Step S208). Specifically, the turn determination unit 152 determines whether or not the positions of the pupils of the face of the subject detected by the face detector 151 have changed between the two images corresponding to the two temporally adjacent pieces of image data. For example, the turn determination unit 152 determines whether or not the pupils of the face of the subject in the latest image have changed from the state where the pupils of the face of the subject were pointed toward the front in the previous image. If the turn determination unit 152 determines that the angle of the face detected by the face detector 151 has changed (Step S208: Yes), the imaging apparatus 1 proceeds to Step S209. Contrarily, if the turn determination unit 152 determines that the angle of the face detected by the face detector 151 has not changed (Step S208: No), the imaging apparatus 1 returns to Step S208.

The imaging controller 156 causes the imaging device 102 to shoot in Step S209. For example, the imaging controller 156 causes the imaging device 102 to image the subject $O_1$ who has turned the face sideways from the front (a second time).

The angle calculation unit 153 calculates the angle between the position at which the subject faces the front and the face-turn position, based on the two pieces of image data generated by the imaging device 102 in Steps S207 and S209 (Step S210).

Figure 8:
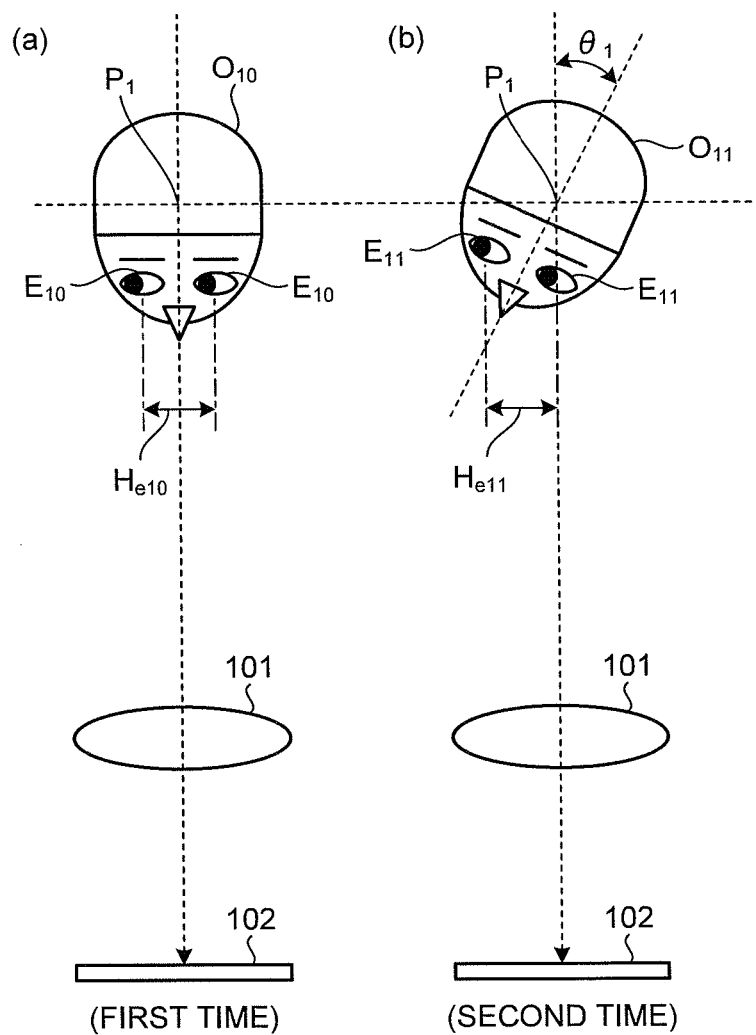
FIG. 8 is a schematic diagram illustrating an outline of a calculation method for calculating the angle of turn of the face of a subject by an angle calculation unit of the imaging apparatus according to the first embodiment of the present invention.

FIG. 8 is a schematic diagram illustrating an outline of a calculation method for calculating the angle of turn of the face of the subject by the angle calculation unit 153. In FIG. 8, (a) illustrates a state, viewed from the above, where a subject $O_{10}$ in the image corresponding to the image data generated by the imaging device 102 in Step S207 faces the front with respect to the imaging apparatus 1 (the first time). In FIG. 8, (b) illustrates a state, viewed from the above, where a subject $O_{11}$ in the image corresponding to the image data generated by the imaging device 102 in Step S209 faces obliquely at an angle $\theta_1$ with respect to the imaging apparatus 1 (the second time).

As illustrated in FIG. 8, the angle calculation unit 153 calculates a width $H_{en}$ between the centers of eyes $E_{10}$ of the face of the subject $O_{11}$ detected by the face detector 151 and a width $H_{e11}$ between the centers of eyes $E_{11}$ of the face of the subject $O_{11}$, respectively, and divides the width $H_{e11}$ by the width $H_{e10}$. Accordingly, the angle calculation unit 153 calculates the angle $\theta_1$ of the face of the subject $O_{11}$ whose face has been turned from the front.

After Step S210, the distance calculation unit 154 calculates the distance of a baseline length of when a 3D image is displayed using the two pieces of image data generated by the imaging device 102 in Steps S207 and S209 (Step S211).

Figure 9:
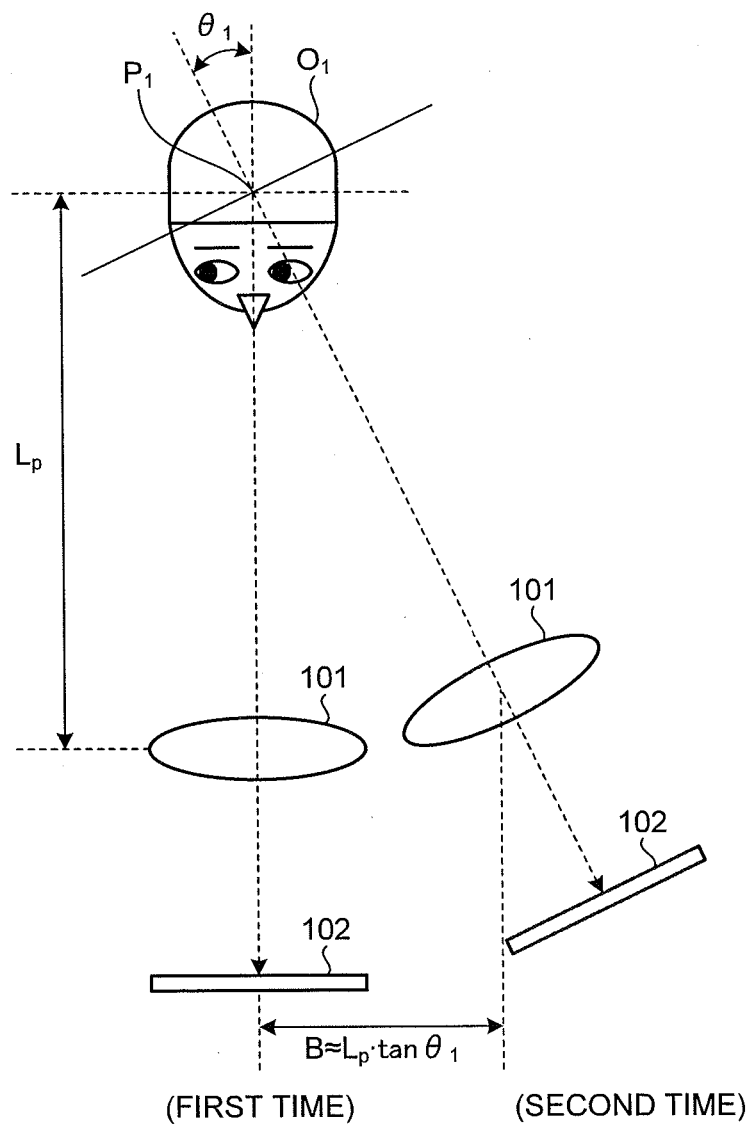
FIG. 9 is a schematic diagram illustrating an outline of a calculation method for calculating a distance by a distance calculation unit of the imaging apparatus according to the first embodiment of the present invention.

FIG. 9 is a schematic diagram illustrating an outline of a calculation method for calculating a distance by the distance calculation unit 154. FIG. 9 illustrates a state, viewed from the above, where the subjects in the images corresponding to the two pieces of image data generated by the imaging device 102 in Steps S207 and S209 are virtually superimposed.

As illustrated in FIG. 9, if the directions of the face of the subject in (a) and (b) of FIG. 8 are virtually superimposed, it is possible to obtain a similar result to 3D image data shot by a twin-lens imaging apparatus where imaging units are placed in advance at an interval of a baseline length B. In other words, if the subject $O_1$ turns the face at the angle $\theta_1$ from the state of facing the front, the following equation (1) holds where the distance between the lens unit 101 and a center $P_1$ of the subject $O_1$ is $L_p$.

$$B \approx L_p \cdot \tan \theta_1 \quad (1)$$

Figure 10:
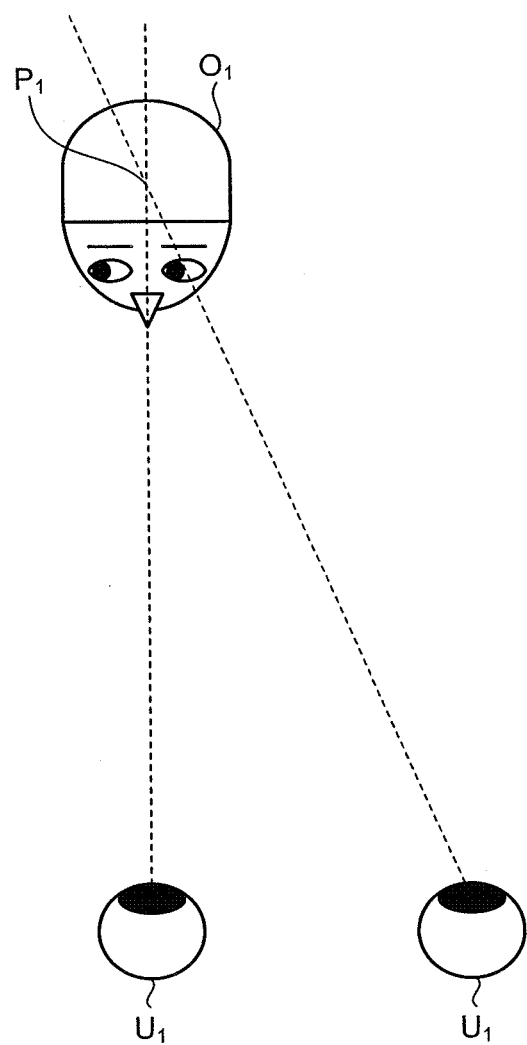
FIG. 10 is a diagram illustrating a state where the photographer perceives the subject three-dimensionally.

In this manner, the distance calculation unit 154 calculates the distance of the baseline length B using equation (1). Consequently, a display of the two pieces of image data on the display unit 31 as illustrated in FIG. 10 corresponds to the subject $O_1$ three-dimensionally perceived by a photographer $U_1$. Accordingly, it is possible to shoot a high contrast image of the subject $O_1$. The distance $L_p$ may be calculated by the distance calculation unit 154 performing a contrast AF process on image data generated by the imaging device 102, may be calculated based on a signal from a phase difference pixel (not illustrated) provided to the imaging device 102, or may be preset.

After Step S211, the two pieces of image data generated by the imaging device 102 in Steps S207 and S209 are associated with the distance calculated by the distance calculation unit 154 to record them as 3D image data in the recording medium 13 (Step S212).

Next, the image processing unit 155 performs image processing on the two pieces of image data as 2D image processing data, based on the distance calculated by the distance calculation unit 154, and records the image data in the recording medium 13 (Step S213). After Step S213, the imaging apparatus 1 returns the main routine of FIG. 4.

Figure 11:
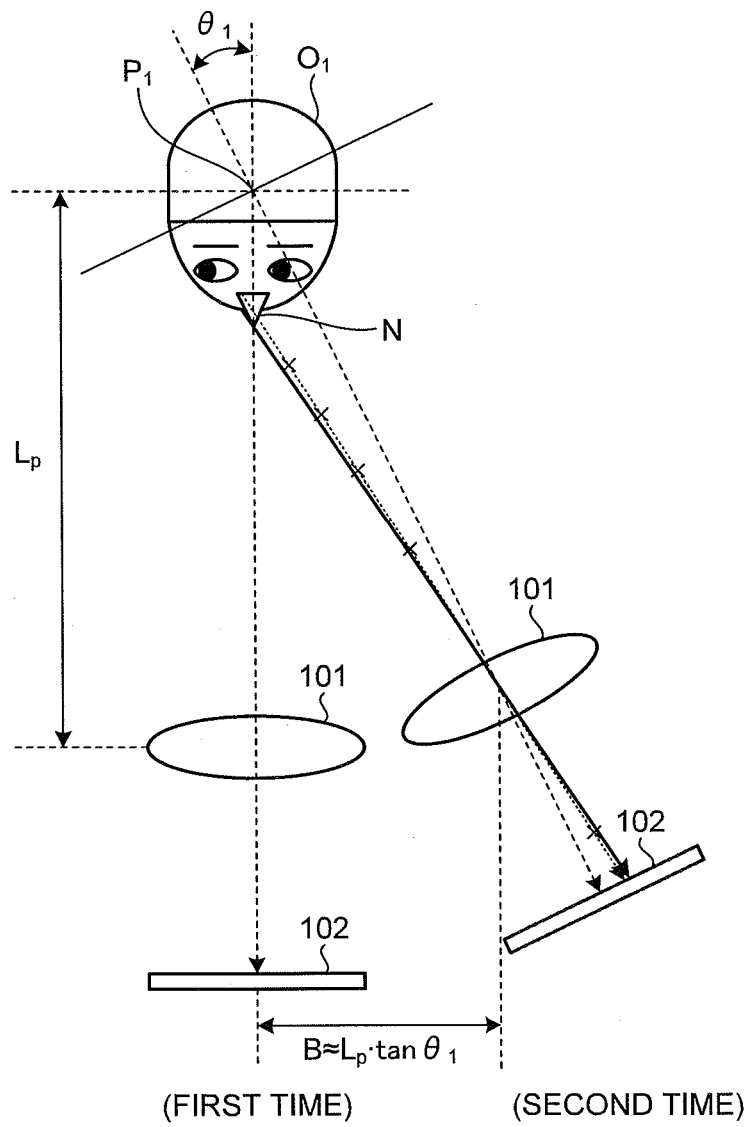
FIG. 11 is a schematic diagram illustrating an outline of when an image processing unit of the imaging apparatus according to the first embodiment of the present invention performs image processing.
Figure 12A:
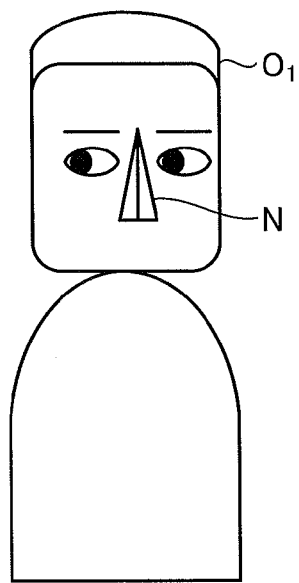
FIG. 12A is a diagram illustrating an example of an image before the image processing unit of the imaging apparatus according to the first embodiment of the present invention performs image processing.
Figure 12B:
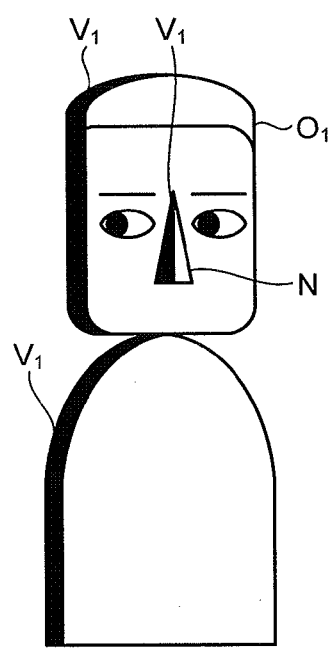
FIG. 12B is a diagram illustrating an example of an image after the image processing unit of the imaging apparatus according to the first embodiment of the present invention performs image processing.

FIG. 11 is a schematic diagram illustrating an outline of the implementation of image processing by the image processing unit 155. FIG. 12A is a schematic diagram illustrating an example of an image before the image processing unit 155 performs image processing on the image data. FIG. 12B is a schematic diagram illustrating an example of an image after the image processing unit 155 performs image processing on the image data. FIG. 11 illustrates a state, viewed from the above, where the subjects in the images corresponding to the two pieces of image data generated by the imaging device 102 in Steps S207 and S209 are virtually superimposed.

As illustrated in FIG. 11, the image processing unit 155 virtually superimposes the subjects $O_1$ in the images corresponding to the two pieces of image data generated by the imaging device 102 in Steps S207 and S209. If the subject $O_1$ turns the face, the image processing unit 155 detects a part that disappears due to a bump such as a nose N (an area whose image is not formed on the imaging device 102), and performs image processing to fill the part with black like a shade. Specifically, as illustrated in FIGS. 12A and 12B, the image processing unit 155 performs image processing to fill parts $V_1$ that disappear due to areas such as the nose N with black (FIG. 12A→FIG. 12B). Consequently, the shade and shadow of the subject $O_1$ is enhanced. Accordingly, it is possible to have a 2D display with a three-dimensional effect and shoot a high contrast image of the subject $O_1$. Furthermore, it is possible to generate similar 2D image data with a three-dimensional effect as if a plurality of stroboscopes is used to shoot the subject $O_1$. Furthermore, if an image corresponding to image data on which the image processing unit 155 has performed image processing is played back on an external device, it is possible to enhance the shade and shadow of the subject $O_1$ and display the subject $O_1$ three-dimensionally even without a 3D display function. In FIG. 12B, the image processing unit 155 may perform image processing to reduce the variables of the saturation and the hue for the part $V_1$, or perform image processing to reduce the contrast and the exposure value.

Return to FIG. 6 to continue the explanation of Step S214 and the subsequent steps.

In Step S214, the display controller 157 causes the display unit 31 to display a warning. For example, the display controller 157 causes the display unit 31 to display a message and icon that prompts the subject to face the front.

Next, when a release signal to instruct shooting has been input from the input unit 11 (Step S215: Yes), the imaging controller 156 causes the imaging device 102 to shoot (Step S216). After Step S216, the imaging apparatus 1 returns to the main routine of FIG. 4.

If the release signal to instruct shooting has not been input from the input unit 11 in Step S215 (Step S215: No), the imaging apparatus 1 returns to the main routine of FIG. 4.

If a pair of pupils has not been detected by the face detector 151 in Step S205 (Step S205: No), the imaging apparatus 1 proceeds to Step S214.

Figure 13:
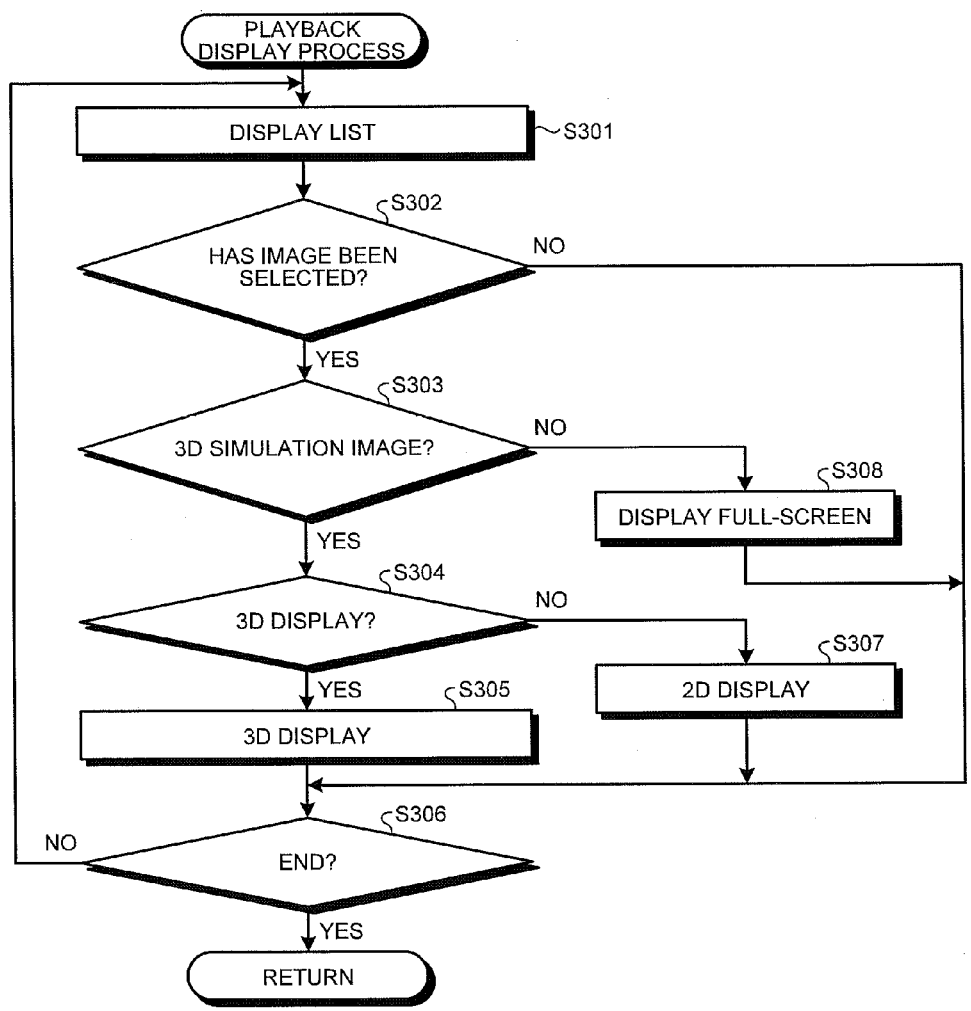
FIG. 13 is a flowchart illustrating an outline of the playback display process of FIG. 4.

Next, the playback display process of Step S107 of FIG. 4 is described in detail. FIG. 13 is a flowchart illustrating an outline of the playback display process.

As illustrated in FIG. 13, firstly, the display controller 157 causes the display unit 31 to display a list of a plurality of images corresponding to a plurality of pieces of image data recorded in the recording medium 13 (Step S301).

Next, if an image has been selected from the plurality of images displayed on the display unit 31 via the input unit 11 (Step S302: Yes), the imaging apparatus 1 proceeds to Step S303 described below. Contrarily, if an image has not been selected from the plurality of images displayed on the display unit 31 via the input unit 11 (Step S302: No), the imaging apparatus 1 proceeds to Step S306 described below.

If the selected image is a 3D simulation image in Step S303 (Step S303: Yes), when 3D display is possible (Step S304: Yes), the display controller 157 causes the display unit 31 to display a 3D image generated by the image processing unit 155 based on the baseline length associated with the 3D image data (Step S305).

Next, if an instruction signal to end the playback of the image data has been input via the input unit 11 (Step S306: Yes), the imaging apparatus 1 returns to the main routine of FIG. 4. Contrarily, if the instruction signal to end the playback of the image data has not been input via the input unit 11 (Step S306: No), the imaging apparatus 1 returns to Step S301.

If the selected image is a 3D simulation image in Step S303 (Step S303: Yes), when 3D display is not possible (Step S304: No), the display controller 157 causes the display unit 31 to display a 2D image corresponding to 2D image data generated by the image processing unit 155 (Step S307). For example, the display controller 157 causes the display unit 31 to display a 2D image corresponding to the image data on which image processing has been performed by the image processing unit 155, the image data having been described in the above-mentioned FIG. 12B. After Step S307, the imaging apparatus 1 proceeds to Step S306.

If the selected image is not a 3D simulation image in Step S303 (Step S303: No), the display controller 157 causes the display unit 31 to display a 2D image corresponding to the image data full-screen (Step S308). After Step S308, the imaging apparatus 1 proceeds to Step S306.

According to the above-described first embodiment of the present invention, a subject full of three-dimensional effects can be shot with a simple configuration.

Moreover, according to the first embodiment of the present invention, simple 3D image data can be generated by having the subject to turn the face.

Moreover, according to the first embodiment of the present invention, the image processing unit 155 performs image processing to fill black in an area whose image is not formed on the imaging device 102 in the latest image, and accordingly a high contrast image where the shade and shadow of the subject is enhanced can be shot even in 2D display. An image that can be obtained in this manner in accordance with a turned direction changes. Accordingly, the image processing performed by the image processing unit 155 changes in accordance with the turned direction. Therefore, it can naturally be applied to areas other than the face. The image processing by the image processing unit 155 has a feature that puts a uniform effect in a direction perpendicular to the turned direction, and the effect sequentially changes in the turned direction such that how light is cast is changed with respect to the turned direction. Naturally, a more detailed correction may be added in accordance with three-dimensional information obtained by a turn as is clear from FIG. 11. It can be said to be image processing that changes according to the magnitude of the angle of turn, or image processing that changes according to the direction of the angle of turn. Furthermore, the image processing unit 155 may change not only the brightness, but also the color and contrast in accordance with the turn of the face of the subject.

Modification of First Embodiment

Next, a modification of the first embodiment of the present invention is described. In the above-mentioned first embodiment, the display controller 157 causes the display unit 31 to display the guide image $G_1$ that prompts the subject to turn the face, but may cause the display unit 31 to display another guide image.

Figure 14:
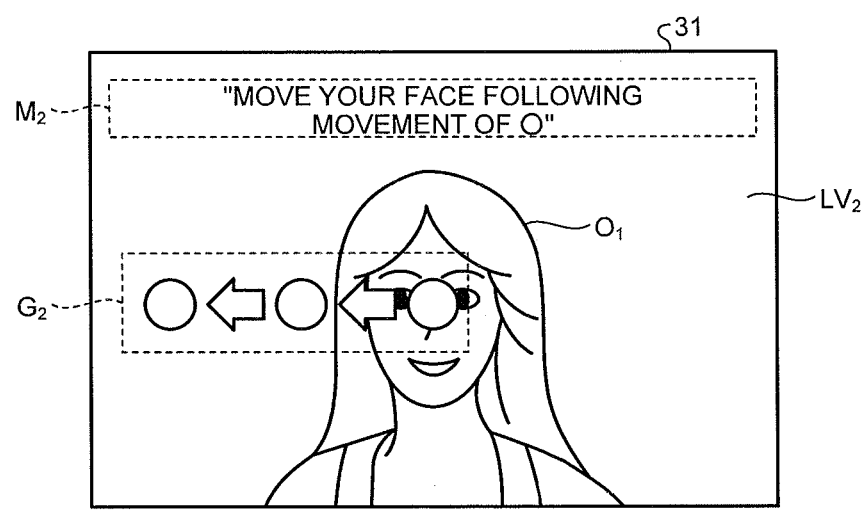
FIG. 14 is a diagram illustrating an example of a guide image displayed on a display unit according to a modification of the first embodiment of the present invention.

FIG. 14 is a diagram illustrating an example of a guide image displayed on a display unit according to the modification of the first embodiment of the present invention.

Figure 15:
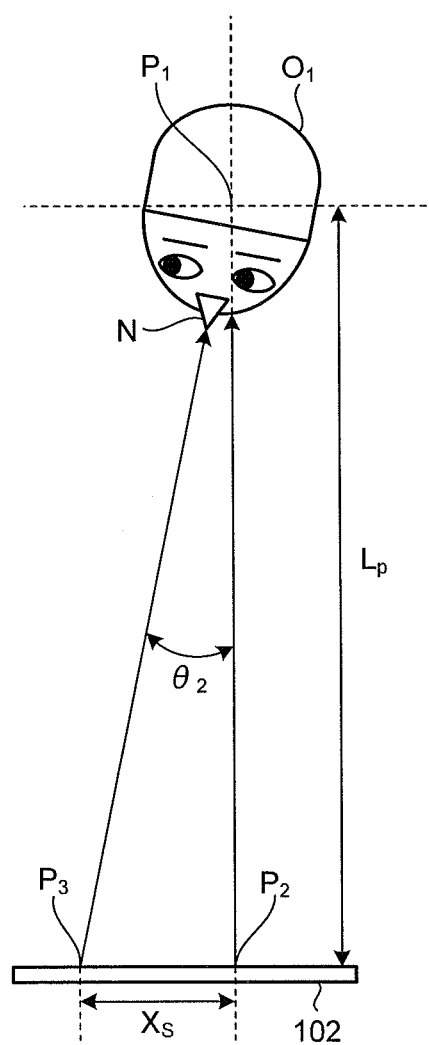
FIG. 15 is a schematic diagram illustrating an outline of a calculation method to be calculated by an angle calculation unit according to the modification of the first embodiment of the present invention.

As illustrated in FIG. 14, the display controller 157 superimposes a guide image $G_2$ and message $M_2$ that prompts the subject $O_1$ to turn the face on a live view image $LV_2$ and causes the display unit 31 to display them. Consequently, the subject $O_1$ turns the face in accordance with the guide image $G_2$. In this case, as illustrated in FIG. 15, a position of the nose N whose image is formed on the imaging device 102 when the face of the subject $O_1$ faces the front is defined as $P_2$. A position of the nose N whose image is formed on the imaging device 102 when the subject $O_1$ turns the face from the state of facing the front in accordance with the guide image $G_2$ is defined as $P_3$. The distance between the position $P_2$ and the position $P_3$ is defined as $X_s$. The angle calculation unit 153 calculates an angle $\theta_2$ at which the subject $O_1$ turns the face by the following equation (2).

$$\theta_2 = \arctan(X_s/L_p) \qquad (2)$$

In this manner, the angle calculation unit 153 can calculates the angle $\theta_2$ at which the subject $O_1$ turns the face.

In the modification of the first embodiment, the distance between the imaging device 102 and the subject $O_1$ is preset. However, the distance between the imaging device 102 and the subject $O_1$ may be calculated in accordance with, for example, the size of the face of the subject $O_1$ in an image.

Second Embodiment

Next, a second embodiment of the present invention is described. An imaging apparatus according to the second embodiment is different in configuration from the imaging apparatus 1 according to the above-mentioned first embodiment, and is also different in the self-portrait shooting mode process and the playback display process. Specifically, the imaging apparatus according to the second embodiment performs image processing in accordance with bumps and dips of the face of a subject. Hence, reference will be made below to the configuration of the imaging apparatus according to the second embodiment, and then the self-portrait shooting mode process and playback display process to be executed by the imaging apparatus according to the second embodiment. The same reference signs are assigned to similar configurations to those of the imaging apparatus according to the above-mentioned first embodiment, and their explanations are omitted.

Figure 16:
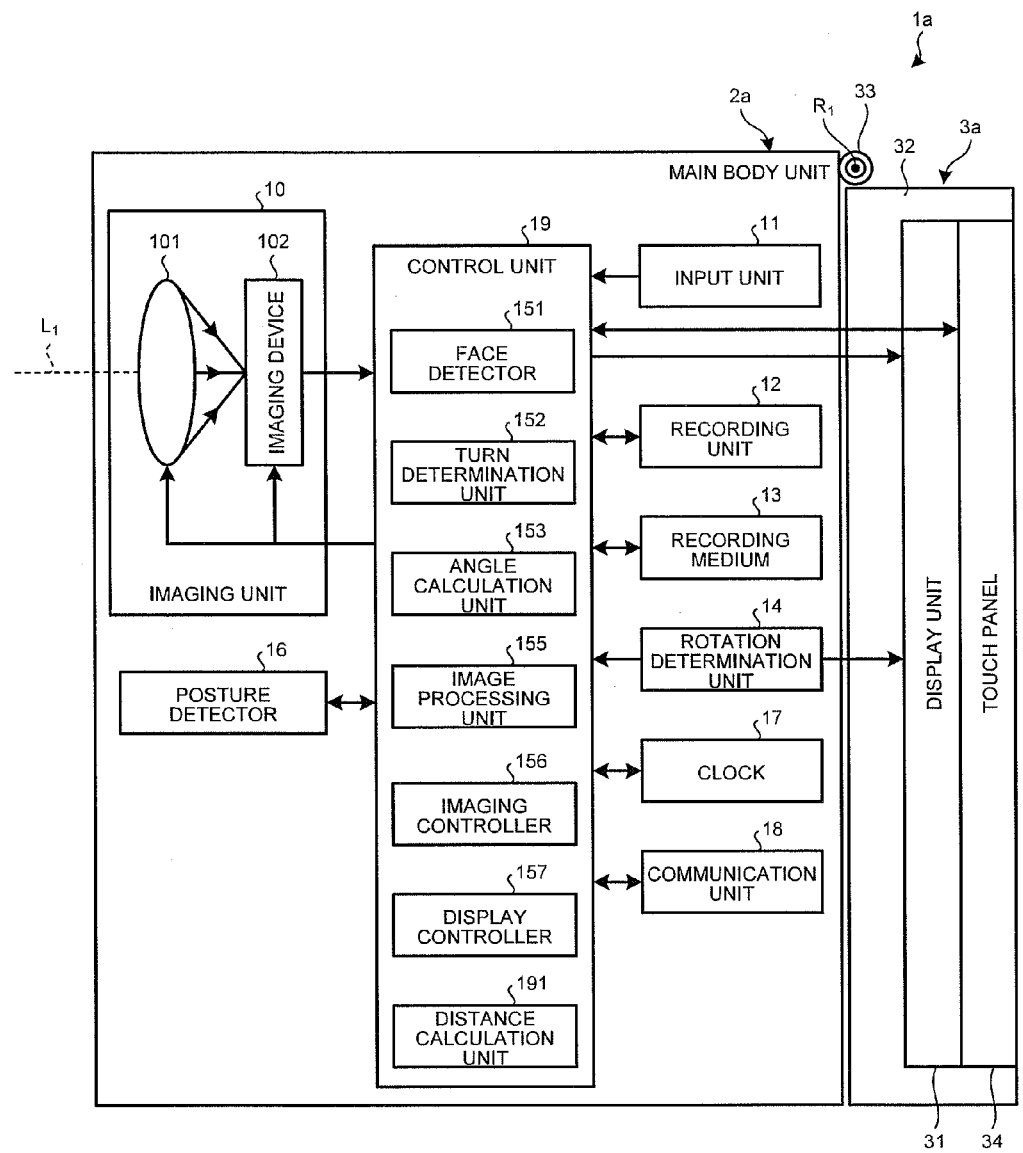
FIG. 16 is a block diagram illustrating the functional configuration of an imaging apparatus according to a second embodiment of the present invention.

FIG. 16 is a block diagram illustrating the functional configuration of the imaging apparatus according to the second embodiment. An imaging apparatus 1a illustrated in FIG. 16 includes a main body unit 2a that images a subject and generates image data of the subject, and a display mechanism 3a that displays an image corresponding to the image data generated by the main body unit 2a.

Firstly, the configuration of the main body unit 2a is described. The main body unit 2a includes the imaging unit 10, the input unit 11, the recording unit 12, the recording medium 13, the rotation determination unit 14, a posture detector 16, a clock 17, a communication unit 18, and a control unit 19.

The posture detector 16 is configured using an acceleration sensor and a gyro sensor to detect the acceleration and the angular velocity, which are generated in the imaging apparatus 1a, and outputs the detection results to the control unit 19.

The clock 17 has a clock function and a function of determining a shooting date and time. The clock 17 outputs date and time data to the control unit 19 to add the date and time data to image data imaged by the imaging device 102.

The communication unit 18 performs wireless communication with an external device in compliance with a specified wireless communication standard to transmit or receive an image file including image data. Examples of the specified wireless communication standard include IEEE 802.11b and IEEE 802.11n. In the second embodiment, any wireless communication standard can be applied. Moreover, the communication unit 18 is configured using a communication device for communicating various pieces of information such as an image file and content data bidirectionally with an external device via a network. The communication device is configured of an antenna that transmits and receives radio wave signals to and from another device, a transmission/reception circuit that demodulates a signal received by the antenna and modulates a signal to transmit, and the like. Moreover, the communication unit 18 periodically transmits a communication signal including identification information (a device ID) to notify its existence at the startup of the imaging apparatus 1a. The communication unit 18 may be provided to a recording medium such as a memory card to be mounted from the outside of the imaging apparatus 1a. Furthermore, the communication unit 18 may be provided to an accessory to be mounted on the imaging apparatus 1a via a hot shoe.

The control unit 19 controls the overall operation of the imaging apparatus 1a by, for example, providing instructions to and transferring data to the units constituting the imaging apparatus 1a. The control unit 19 is configured using a CPU and the like.

The configuration of the control unit 19 is described in detail. The control unit 19 includes the face detector 151, the turn determination unit 152, the angle calculation unit 153, the image processing unit 155, the imaging controller 156, the display controller 157, and a distance calculation unit 191.

The distance calculation unit 191 calculates the distance between the imaging apparatus 1a and each part constituting the face of the subject, based on the angle calculated by the angle calculation unit 153. Specifically, the distance calculation unit 191 calculates distance distribution information to parts constituting the face of the subject, for example, eyes, nose, mouth, and forehead (information on the bumps and dips of the subject), based on the angle calculated by the angle calculation unit 153.

Next, the configuration of the display mechanism 3a is described. The display mechanism 3a includes the display unit 31, the movable unit 32, the rotation support unit 33, and a touch panel 34.

The touch panel 34 is provided, superimposed on the display screen of the display unit 31. The touch panel 34 detects a touch position of an object from the outside, and outputs a position signal in accordance with the detected touch position to the control unit 19. Moreover, the touch panel 34 detects a touch position touched by a user based on information displayed on the display unit 31, for example, an icon image or thumbnail image, and accepts the input of an instruction signal to instruct an operation to be performed by the imaging apparatus 1a in accordance with the detected touch position. The touch panel 34 is generally a resistive, capacitive, or photoelectric touch panel, or the like. In the second embodiment, any type of touch panel can be applied. Furthermore, the movable unit 32 and the touch panel 34 may be integrally formed in the display unit 31.

Figure 17:
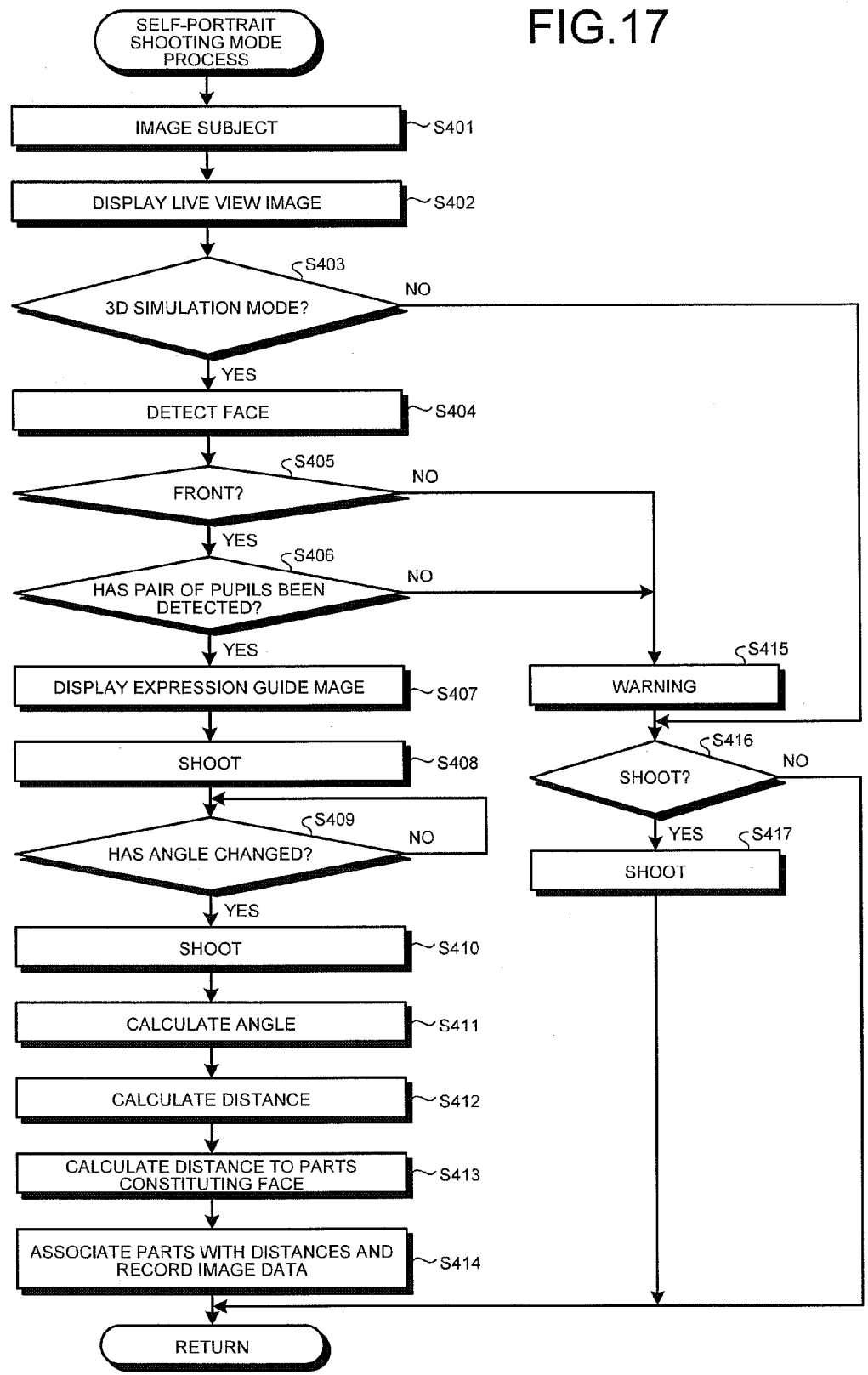
FIG. 17 is a flowchart illustrating an outline of a self-portrait shooting mode process to be executed by the imaging apparatus according to the second embodiment of the present invention.

Reference will be made to the self-portrait shooting mode process to be executed by the imaging apparatus 1a having the above configuration. FIG. 17 is a flowchart illustrating an outline of the self-portrait shooting mode process to be executed by the imaging apparatus 1a.

In FIG. 17, Steps S401 to S404 correspond respectively to Steps S201 to S204 in the above-mentioned FIG. 6.

If the turn determination unit 152 determines that the face of the subject detected by the face detector 151 faces the front in Step S405 (Step S405: Yes), the imaging apparatus 1a proceeds to Step S406 described below. Contrarily, if the turn determination unit 152 determines that the face of the subject detected by the face detector 151 does not face the front (Step S405: No), the imaging apparatus 1a proceeds to Step S415 described below.

Steps S406 to S412 correspond respectively to Steps S205 to S211 in the above-mentioned FIG. 6.

In Step S413, the distance calculation unit 191 calculates the distance to each part constituting the face of the subject detected by the face detector 151.

Figure 18:
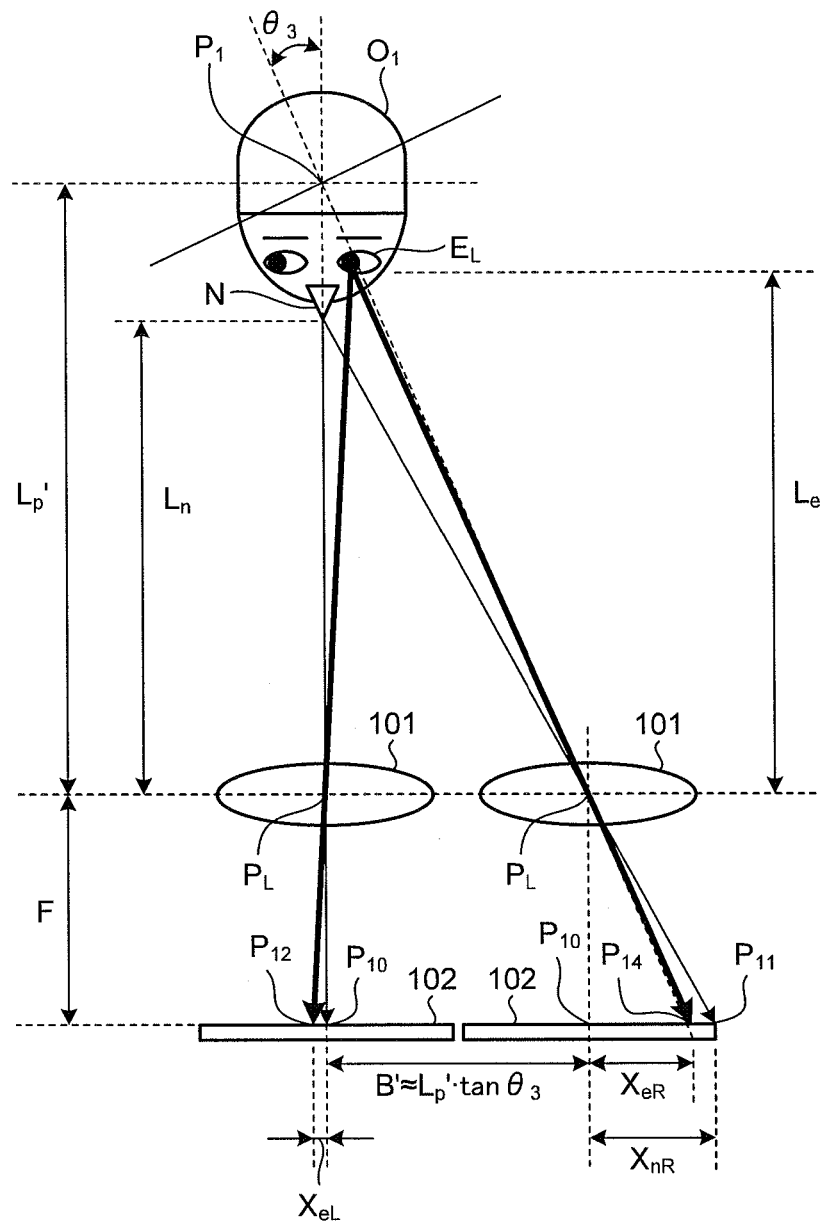
FIG. 18 is a schematic diagram illustrating an outline of a calculation method for calculating the distance to each part constituting the face of a subject by a distance calculation unit of the imaging apparatus according to the second embodiment of the present invention.

FIG. 18 is a schematic diagram illustrating an outline of a calculation method for calculating the distance to each part constituting the face of the subject by the distance calculation unit 191. FIG. 18 illustrates a state, viewed from the above, where the subjects in the images corresponding to the two pieces of image data generated by the imaging device 102 in Steps S408 and S410 are virtually superimposed, and the imaging devices 102 are closely placed on a straight line.

As illustrated in FIG. 18, the distance between the substantial center $P_1$ of the subject $O_1$ and a center $P_L$ of the lens unit 101 is defined as $L_p'$. The focal length of the imaging unit 10 upon shooting of the subject $O_1$ is defined as F. The distance between a center $P_{10}$ of the imaging device 102 at a second time and a position $P_{11}$ where an image of the nose N of the subject $O_1$ is formed is defined as $X_{nR}$. A baseline length corresponding to the distance between two imaging units of a twin-lens still camera when the faces of the subject $O_1$ in the images of the first and second shooting are superimposed is defined as B'. The angle of turn of the face of the subject $O_1$ is defined as $\theta_3$. The distance calculation unit 191 calculates the distance $L_n$ to the nose N of the subject $O_1$ by the following equation (3).

$$L_n = B' \times (F/X_{nR}) \quad (3)$$
$$= L'_p \times \tan\theta_3 \times (F/X_{nR})$$

Moreover, as illustrated in FIG. 18, the distance between the substantial center $P_1$ of the subject $O_1$ and the center $P_L$ of the lens unit 101 is defined as $L_p'$. The focal length upon shooting of the subject $O_1$ is defined as F. The distance between the center $P_{10}$ of the imaging device 102 at a first time and a position $P_{12}$ where an image of a left eye $E_L$ of the subject $O_1$ is formed is defined as $X_{eL}$. The distance between the center $P_{10}$ of the imaging device 102 at a second time and a position $P_{14}$ where an image of the left eye $E_L$ of the subject $O_1$ is formed is defined as $X_{eR}$. A baseline length corresponding to the distance between two imaging units of a twin-lens still camera when the faces of the subject $O_1$ in the images of the first and second shooting are superimposed is defined as B'. The angle of turn of the face of the subject $O_1$ is defined as $\theta_3$. The distance calculation unit 191 calculates a distance $L_e$ to the left eye $E_L$ of the subject $O_1$ by the following equation (4).

$$L_e = B' \times (F/(X_{eR} + X_{eL})) \quad (4)$$
$$= L'_p \times \tan\theta_3 \times (F/(X_{eR} + X_{eL}))$$

In this manner, the distance calculation unit 191 calculates the distance to each part constituting the face of the subject in the two images corresponding to the two pieces of image data generated by the imaging device 102 in Steps S408 and S410, and generates distance distribution information of the parts constituting the face of the subject (information on the bumps and dips of the face). In FIG. 18, the distances to the nose N and the left eye $E_L$ of the subject $O_1$ are calculated. However, the distances to the mouse and forehead, and parts constituting the body of the subject $O_1$, for example, hand and stomach, may be calculated.

Return to FIG. 17 to continue the explanation of Step S414 and the subsequent steps.

In Step S414, the imaging controller 156 associates the two pieces of image data generated by the imaging device 102 with the distances to the parts constituting the face of the subject calculated by the distance calculation unit 191, and records them in the recording medium 13. After Step S414, the imaging apparatus 1a returns to the main routine of FIG. 4.

Steps S415 to S417 correspond respectively to Steps S214 to S216 in FIG. 6.

Figure 19:
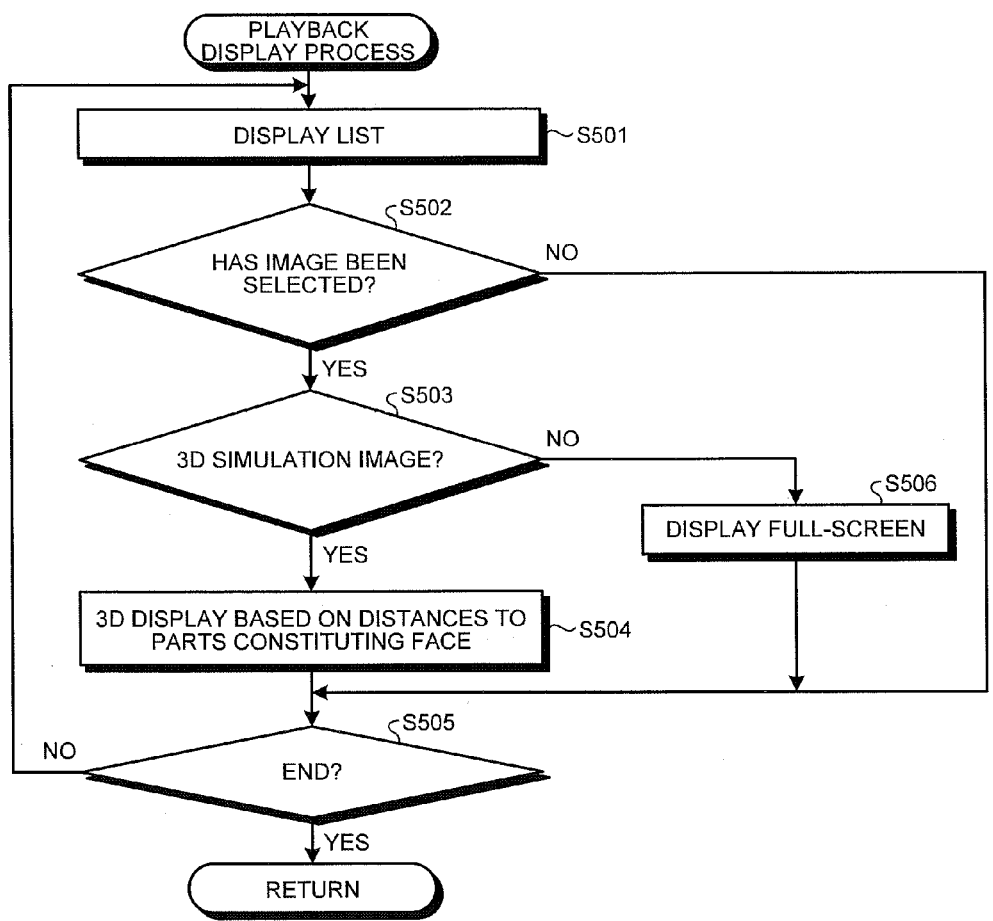
FIG. 19 is a flowchart illustrating an outline of a playback display process to be executed by the imaging apparatus according to the second embodiment of the present invention.

Next, the playback display process to be executed by the imaging apparatus 1a is described. FIG. 19 is a flowchart illustrating an outline of the playback display process to be executed by the imaging apparatus 1a.

Steps S501 to S503 correspond respectively to Steps S301 to S303 in the above-mentioned FIG. 13.

In Step S504, the display controller 157 causes the display unit 31 to display a 3D image generated by the image processing unit 155 performing image processing on the two pieces of image data based on the distances to the parts constituting the face of the subject stored in header information of an image file. The image processing unit 155 generates a 3D image based on the distances to the parts constituting the face of the subject stored in the header information of the image file. However, image processing may be performed which increases one or more of the saturation, the contrast, and the exposure value according to the distances to the parts constituting the face of the subject. In this case, the image processing unit 155 may perform image processing to increase the exposure value for a part of the face closer to the imaging apparatus 1a. For example, the image processing unit 155 performs image processing to increase the exposure value or saturation in stages from an edge of the face of the subject toward the node according to the distance. Consequently, the display controller 157 can cause the display unit 31 to display a high contrast image by enhancing the shade and shadow of the subject. After Step S504, the imaging apparatus 1a proceeds to Step S505.

Steps S505 and S506 correspond respectively to Steps S306 and S308 in FIG. 13.

According to the above-described second embodiment of the present invention, a subject full of three-dimensional effects can be shot with a simple configuration.

Moreover, according to the second embodiment of the present invention, the image processing unit 155 performs the image processing to increase one or more of the saturation, the exposure value, and the contrast, on image data generated by the imaging device 102, based on the distances to the parts constituting the face of the subject calculated by the distance calculation unit 191. Accordingly, an image where the shade and shadow of the subject is enhanced can be shot. Naturally, it can also be applied to areas other than the face.

Third Embodiment

Next, a third embodiment of the present invention is described. An imaging apparatus according to the third embodiment is different in configuration from the imaging apparatus 1a according to the above-mentioned second embodiment, and is different in the self-portrait shooting mode process. Specifically, the imaging apparatus according to the third embodiment changes the content of image processing according to the angle of turn of the face of the subject. Hence, reference will be made below to the configuration of the imaging apparatus according to the third embodiment, and then the self-portrait shooting mode process to be executed by the imaging apparatus according to the third embodiment. The same reference signs are assigned to similar configurations to those of the imaging apparatus according to the above-mentioned second embodiment, and their explanations are omitted.

Figure 20:
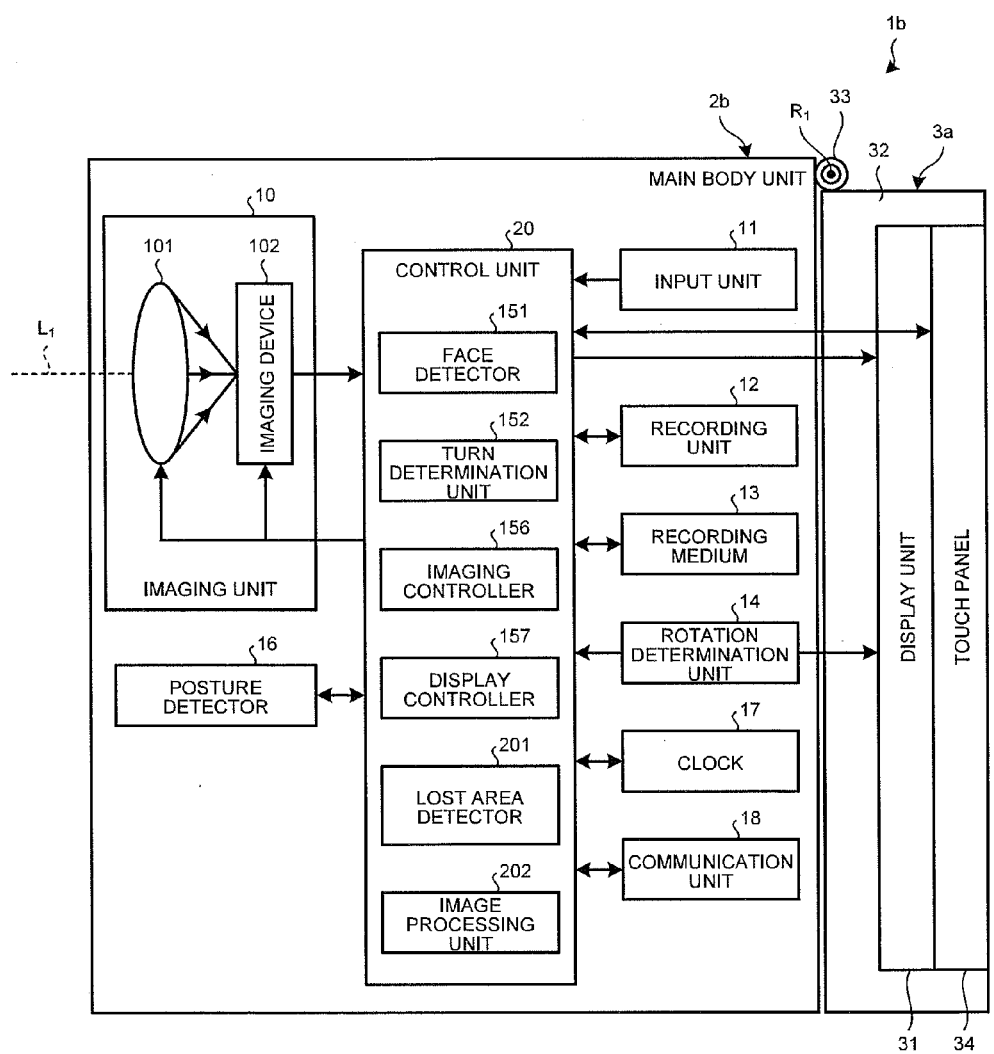
FIG. 20 is a block diagram illustrating the functional configuration of an imaging apparatus according to a third embodiment of the present invention.

FIG. 20 is a block diagram illustrating the functional configuration of the imaging apparatus according to the third embodiment. An imaging apparatus 1b illustrated in FIG. 20 includes a main body unit 2b that images a subject and generates image data of the subject, and the display mechanism 3a.

Firstly, the configuration of the main body unit 2b is described. The main body unit 2b includes the imaging unit 10, the input unit 11, the recording unit 12, the recording medium 13, the rotation determination unit 14, the posture detector 16, the clock 17, the communication unit 18, and a control unit 20.

The control unit 20 controls the overall operation of the imaging apparatus 1b by, for example, providing instructions to and transferring data to the units constituting the imaging apparatus 1b. The control unit 20 is configured using a CPU and the like.

The configuration of the control unit 20 is described in detail. The control unit 20 includes the face detector 151, the turn determination unit 152, the imaging controller 156, the display controller 157, a lost area detector 201, and an image processing unit 202.

The lost area detector 201 detects an area where a background has become lost in the latest image, based on images corresponding to two temporally adjacent pieces of image data generated by the imaging unit 10. Specifically, the lost area detector 201 compares a previous image and the latest image, which are temporally adjacent, and detects the area of a background lost from a linear image in the latest image.

The image processing unit 202 performs image processing on at least an area of the face of the subject in the image based on the area detected by the lost area detector 201. Specifically, the image processing unit 202 performs image processing to increase one or more of the saturation, the exposure value, and the contrast, from an edge of the area of the face of the subject in the image.

Figure 21:
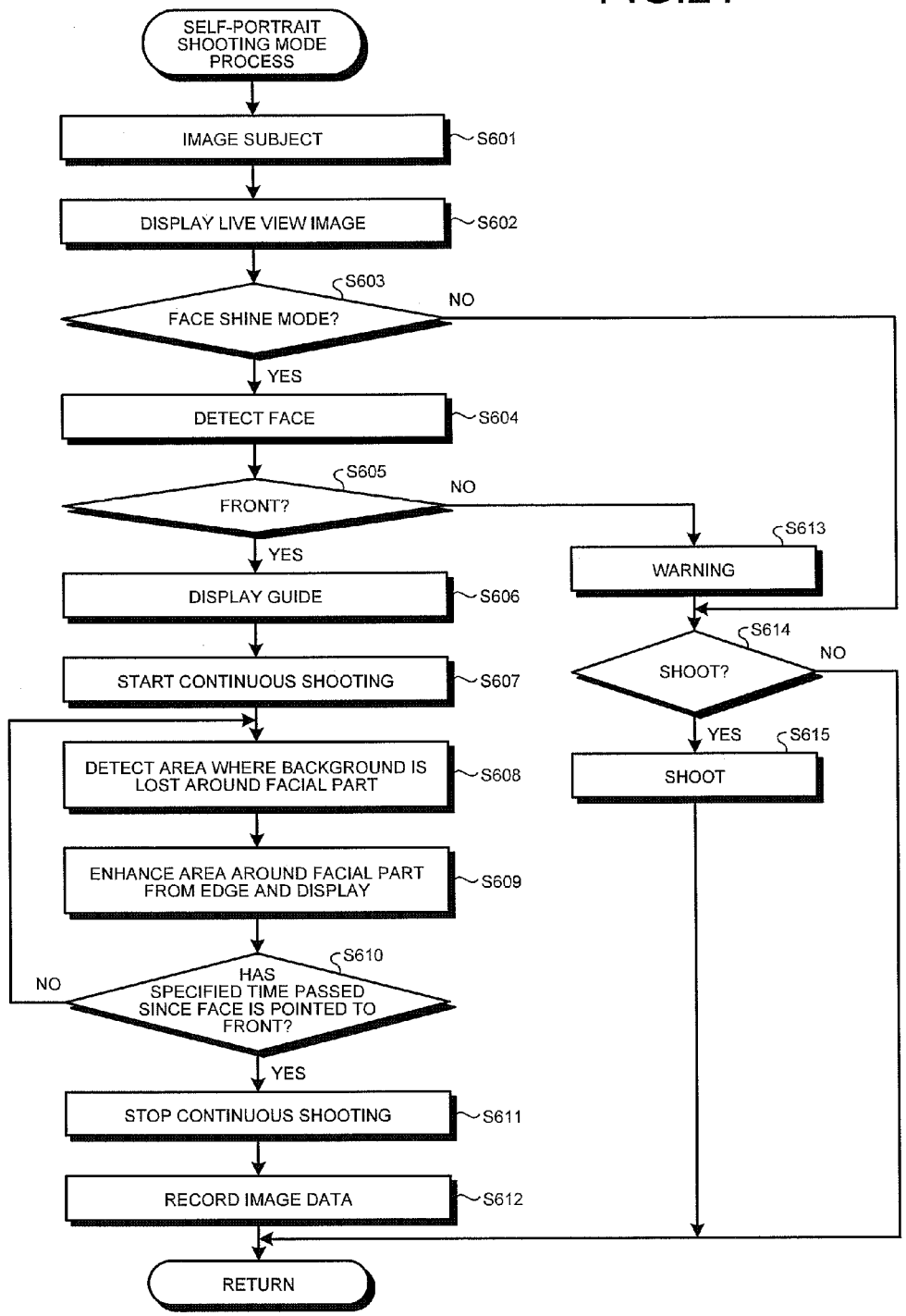
FIG. 21 is a flowchart illustrating an outline of a self-portrait shooting mode process to be executed by the imaging apparatus according to the third embodiment of the present invention.

Reference will be made to the self-portrait shooting mode process to be executed by the imaging apparatus 1b having the above configuration. FIG. 21 is a flowchart illustrating an outline of the self-portrait shooting mode process to be executed by the imaging apparatus 1b.

In FIG. 21, Steps S601 and S602 correspond respectively to Steps S201 and S202 in the above-mentioned FIG. 6.

If the imaging apparatus 1b is set in face shine mode in Step S603 (Step S603: Yes), the imaging apparatus 1b proceeds to Step S604 described below. Contrarily, if the imaging apparatus 1b is not set in face shine mode (Step S603: No), the imaging apparatus 1b proceeds to Step S614 described below.

In Step S604, the face detector 151 detects the face of the subject from the image corresponding to the image data generated by the imaging device 102.

Next, the turn determination unit 152 determines whether or not the face of the subject detected by the face detector 151 faces the front with respect to the imaging apparatus 1b (Step S605). If the turn determination unit 152 determines that the face of the subject detected by the face detector 151 faces the front with respect to the imaging apparatus 1b (Step S605: Yes), the imaging apparatus 1b proceeds to Step S606 described below. Contrarily, if the turn determination unit 152 determines that the face of the subject detected by the face detector 151 does not face the front with respect to the imaging apparatus 1b (Step S605: No), the imaging apparatus 1b proceeds to Step S613.

Figure 22:
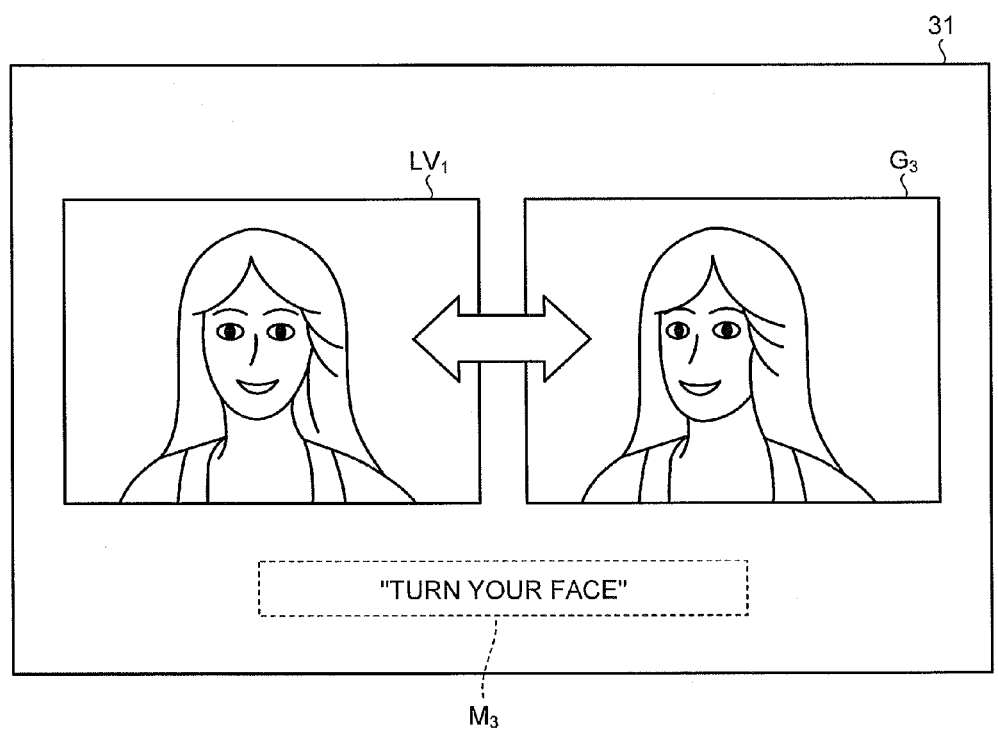
FIG. 22 is a diagram illustrating an example of a guide image displayed on a display unit of the imaging apparatus according to the third embodiment of the present invention.

In Step S606, the display controller 157 causes the display unit 31 to display a guide image prompting the subject to turn the face. Specifically, as illustrated in FIG. 22, the display controller 157 causes the display unit 31 to display the live view image $LV_1$ corresponding to the image data generated by the imaging device 102, and a guide image $G_3$ prompting the change in the direction of the face. Furthermore, the display controller 157 causes the display unit 31 to display information for supporting the guide image $G_3$, for example, a message $M_3$, "Turn your face".

Next, the imaging controller 156 controls the imaging device 102 to start continuous shooting to continuously shoot the subject at specified intervals (Step S607).

The lost area detector 201 then compares an image where the face of the subject faces the front (for example, the live view image $LV_1$) with an image corresponding to the latest image data generated by the imaging device 102, and detects an area where the background has disappeared around the facial part of the subject (Step S608).

Next, the image processing unit 202 performs image processing to enhance an area around the facial part of the subject, from an edge, based on the area detected by the lost area detector 201 (Step S609).

Figure 23:
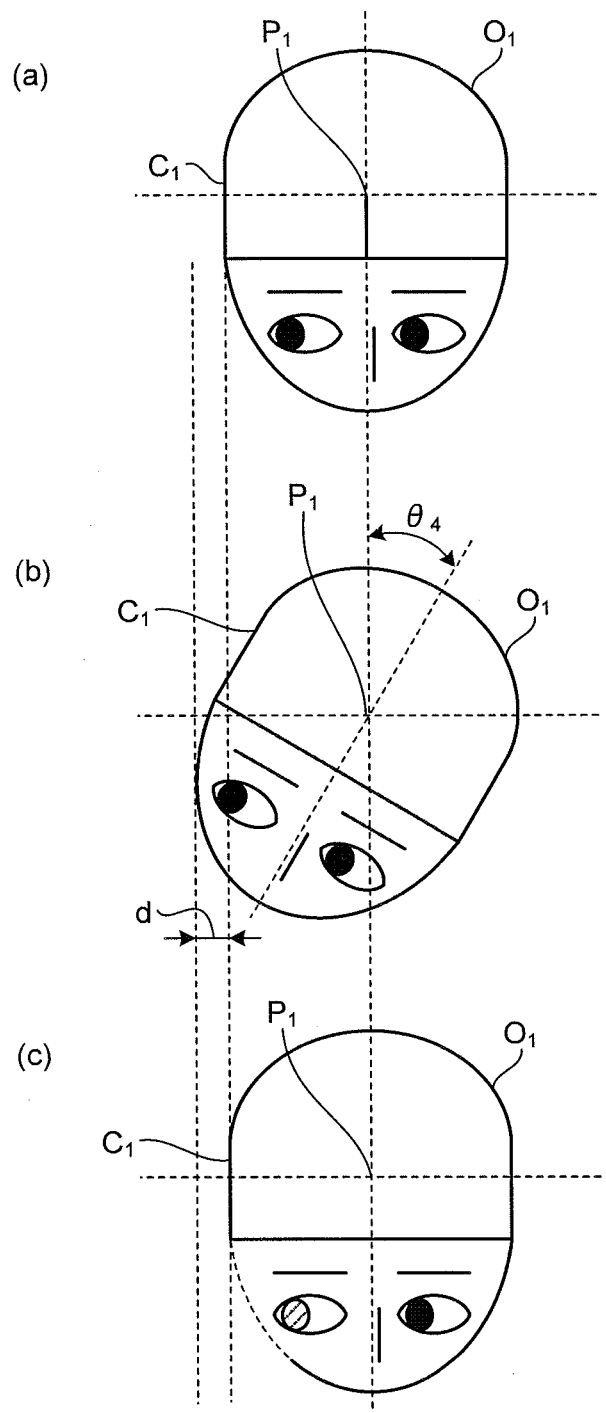
FIG. 23 is a schematic diagram illustrating an outline of a detection method for detection by a lost area detector of the imaging apparatus according to the third embodiment of the present invention.

FIG. 23 is a schematic diagram illustrating an outline of a detection method for detection by the lost area detector 201. As illustrated in FIG. 23, if the subject $O_1$ follows the guide image $G_3$ and turns the face at an angle $\theta_4$ (See (b) of FIG. 23) from the state of facing the front with respect to the imaging apparatus 1b (See (a) of FIG. 23), the lost area detector 201 detects an area d of the background lost from the latest image by the turn of the face of the subject $O_1$. The image processing unit 202 subsequently performs image processing to gradually enhance the area around the facial part of the subject $O_1$ from an edge $C_1$ toward the center $P_1$, based on the area d (distance) detected by the lost area detector 201 (See (c) of FIG. 23). Specifically, the image processing unit 202 performs image processing to gradually increase the exposure value from the edge $C_1$ toward the center of the face of the subject $O_1$. The image processing unit 202 may perform image processing to change not only the exposure value but also the variables of the color space, for example, the saturation and the hue. Naturally, the image processing unit 202 may perform image processing such as soft focus from the edge $C_1$ toward the center of the face of the subject $O_1$. Furthermore, in FIG. 23, the lost area detector 201 detects only an area in the horizontal direction, but may detect an area in the vertical direction, or may detect an area of a background lost in the latest image in a combination of the horizontal and vertical directions.

Figure 24A:
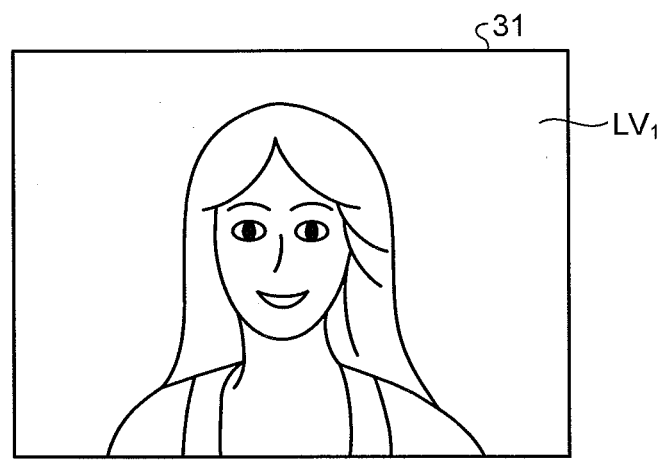
FIG. 24A is a diagram illustrating an example of an image before an image processing unit of the imaging apparatus according to the third embodiment of the present invention performs image processing.
Figure 24B:
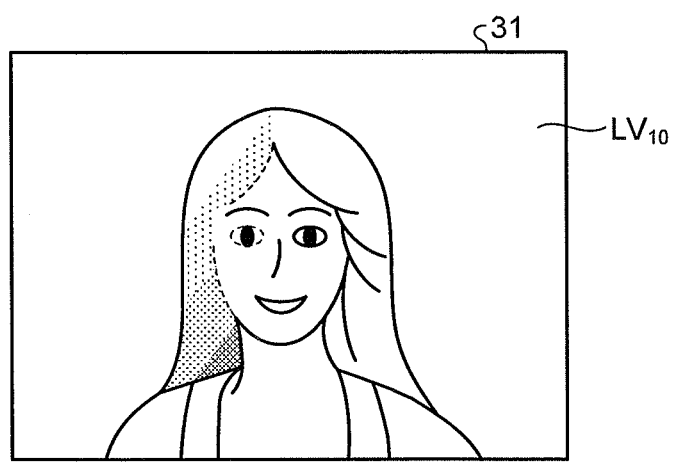
FIG. 24B is a diagram illustrating an example of an image after the image processing unit of the imaging apparatus according to the third embodiment of the present invention performs image processing.

After Step S609, the display controller 157 causes the display unit 31 to display an image corresponding to the image data on which the image processing unit 202 has performed image processing (Step S609). Specifically, as illustrated in FIGS. 24A and 24B, the display controller 157 causes the display unit 31 to display a live view image $LV_{10}$ corresponding to the image data on which the image processing unit 202 has performed image processing (FIG. 24A→FIG. 24B). Consequently, the user can perform desired image processing by turning the face while checking the image displayed on the display unit 31. In FIG. 24B, the image processing by the image processing unit 202 is expressed by hatching.

If the turn determination unit 152 determines that a specified time, for example, three seconds have passed since the face of the subject was pointed to the front with respect to the imaging apparatus 1b (Step S610: Yes), the imaging controller 156 controls the imaging device 102 to stop the continuous shooting to continuously shoot the subject at specified intervals (Step S611). Contrarily, if the turn determination unit 152 determines that the specified time has not passed since the face of the subject was pointed to the front with respect to the imaging apparatus 1b (Step S610: No), the imaging apparatus 1b returns to Step S608.

After Step S611, the imaging controller 156 records the image data on which the image processing unit 202 has performed image processing, in the recording medium 13 (Step S612). After Step S612, the imaging apparatus 1b returns to the main routine of FIG. 4.

Steps S614 to S615 correspond respectively to Steps S215 to S216 in FIG. 6.

According to the above-described third embodiment of the present invention, the image processing unit 202 performs image processing to increase the brightness of the face of a subject in a direction the subject turns the face. Accordingly, the shade and shadow of the subject can be easily enhanced. Naturally, the image processing unit 202 may change the contrast and the color, or perform the soft focus process.

Furthermore, according to the third embodiment of the present invention, shooting can be performed while an image displayed on the display unit 31 is checked about the state of image processing.

Other Embodiments

Moreover, the imaging apparatus according to some embodiments can also be applied to, for example, electronic equipment such as a digital camera, and a digital video camera, a mobile phone and a tablet mobile device that have an imaging function, other than a digital single-lens reflex camera.

Moreover, the imaging apparatus according to some embodiments can also be applied to electronic equipment that has a detachable lens, such as a digital single-lens reflex camera, a digital video camera, and a mobile phone and a tablet mobile device that have an imaging function, other than a digital camera with a built-in lens. Especially, this makes it possible to find unnoticed attractiveness and accordingly may be used instead of a mirror. In short, it can also be used for aesthetic equipment, a check-imaging apparatus, medical equipment for rehab and the like for the purpose of guidance, and the like. The case of one person has been described herein. However, when this technology is applied to two persons, it can serve as a camera that prompts the shooting to direct a soap opera by their eyes, directions of the faces, postures, and the like. Furthermore, it is possible to provide a guiding apparatus that encourage pleasant communication by their locked gaze and expressions, apart from the imaging apparatus.

Moreover, the imaging apparatus according to some embodiments has the integrally formed main body unit and display unit. However, the main body unit and the display unit may be configured separately. In this case, it is required, for example, that the main body unit and the display unit can transmit image data, instruction data, and the like bidirectionally.

Moreover, the program to be executed by the imaging apparatus according to the present invention is provided by being recorded in file data in an installable or executable format in a computer-readable recording medium such as a CD-ROM, a flexible disk (FD), a CD-R, a digital versatile disk (DVD), a USB medium, or flash memory.

Moreover, the program to be executed by the imaging apparatus according to some embodiments may be configured to be provided by being stored on a computer connected to a network such as the Internet, and being downloaded via the network. Furthermore, the program to be executed by the imaging apparatus according to some embodiments may be configured to be provided or distributed via a network such as the Internet.

In the explanations of the flowcharts in the description, the temporal process relationships between steps are clarified using terms such as "firstly," "then", and "next". However, the orders of the processes necessary to carry out the present invention are not uniquely fixed by these terms. In other words, the orders of the processes in the flowchart described in the description can be changed within a range that does not present a contradiction.

In this manner, the present invention can include various embodiments that are not described herein. Various design changes and the like can be made within the scope of the technical idea specified by the claims.

According to some embodiments, it is possible to capture images of a subject giving three-dimensional effects with a simple configuration.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An imaging apparatus comprising:
an imaging unit configured to capture images of a subject to generate image data of the subject;
a display unit configured to display the images corresponding to the image data generated by the imaging unit;
a face detector configured to detect a face of the subject from the images corresponding to the image data generated by the imaging unit;
a display controller configured to cause the display unit to display a guide image for prompting the subject to change a direction of the face detected by the face detector;
an angle calculation unit configured to calculate an angle of turn of the face of the subject from a reference position of the direction of the face of the subject when the display unit displays the guide image, based on the images corresponding to pieces of image data before and after a change in the direction of the face of the subject, the pieces of image data having been generated by the imaging unit;
a distance calculation unit configured to calculate a distance between the imaging apparatus and the face of the subject based on the angle calculated by the angle calculation unit; and
an image processing unit configured to perform image processing on at least one of the pieces of image data before and after the change in the direction of the face of the subject, the pieces of image data having been generated by the imaging unit, according to the change in the direction of the face of the subject detected by the face detector, based on the angle calculated by the angle calculation unit and the distance calculated by the distance calculation unit.

2. The imaging apparatus according to claim 1, further comprising a lost area detector configured to detect an area where a background is lost in the images, based on the images corresponding to the pieces of image data before and after the change in the direction of the face of the subject, the image data having been generated by the imaging unit, wherein
the image processing unit is configured to perform the image processing on at least an area of the face of the subject in the images, based on the area detected by the lost area detector.

3. The imaging apparatus according to claim 2, wherein the image processing unit is configured to perform the image processing from an edge of the area of the face of the subject in the images.

4. The imaging apparatus according to claim 1, wherein the image processing is a process to change variables of a color space.

5. The imaging apparatus according to claim 1, wherein the image processing is a process to generate three-dimensional image data using two pieces of image data.

6. The imaging apparatus according to claim 1, wherein the image processing is a process to change one or more of an exposure value, saturation, and contrast.

7. The imaging apparatus according to claim 1, wherein
the display unit is configured to transit between a state where a display area for displaying the images corresponding to the image data faces a rear side of the imaging apparatus, and a state where the display area faces a front side of the imaging apparatus, and
the display controller is configured to cause the display unit to display the guide image when the display area faces the front side.

8. An imaging method to be executed by an imaging apparatus that is configured to capture images of a subject to generate image data of the subject and to display the images corresponding to the image data, the imaging method comprising:
- an imaging step of capturing the images of the subject to generate the image data of the subject;
- a face detecting step of detecting a face of the subject from the images corresponding to the image data generated in the imaging step;
- a display step of displaying a guide image to prompt the subject to change a direction of the face detected in the face detecting step;
- an angle calculation step of calculating an angle of turn of the face of the subject from a reference position of the direction of the face of the subject when displaying the guide image in the display step, based on the images corresponding to pieces of image data before and after a change in the direction of the face of the subject, the pieces of image data having been generated in the imaging step;
- a distance calculation step of calculating a distance between the imaging apparatus and the face of the subject based on the angle calculated in the angle calculation step; and
- an image processing step of performing image processing on at least one of the pieces of image data before and after the change in the direction of the face of the subject, the pieces of image data having been generated in the imaging step, according to the change in the direction of the face of the subject detected in the face detecting step, based on the angle calculated in the angle calculation step and the distance calculated in the distance calculation step.

9. A non-transitory computer-readable recording medium with an executable program stored thereon, the program instructing an imaging apparatus, which is configured to capture images of a subject to generate image data of the subject and to display the images corresponding to the image data, to perform:
- an imaging step of capturing the images of the subject to generate the image data of the subject;
- a face detecting step of detecting a face of the subject from the images corresponding to the image data generated in the imaging step;
- a display step of displaying a guide image to prompt the subject to change a direction of the face detected in the face detecting step;
- an angle calculation step of calculating an angle of turn of the face of the subject from a reference position of the direction of the face of the subject when displaying the guide image in the display step, based on the images corresponding to pieces of image data before and after a change in the direction of the face of the subject, the pieces of image data having been generated in the imaging step;
- a distance calculation step of calculating a distance between the imaging apparatus and the face of the subject based on the angle calculated in the angle calculation step; and
- an image processing step of performing image processing on at least one of the pieces of image data before and after the change in the direction of the face of the subject, the pieces of image data having been generated in the imaging step, according to the change in the direction of the face of the subject detected in the face detecting step, based on the angle calculated in the angle calculation step and the distance calculated in the distance calculation step.

* * * * *